United States Patent
Diorio et al.

(10) Patent No.: US 8,570,157 B1
(45) Date of Patent: *Oct. 29, 2013

(54) LOCAL PROCESSING OF RECEIVED RFID TAG RESPONSES

(75) Inventors: Christopher J. Diorio, Shoreline, WA (US); Kurt E. Sundstrom, Woodinville, WA (US); Dan Bowman, Seattle, WA (US)

(73) Assignee: Impinj, Inc., Seattle, WA (US)

( * ) Notice: Subject to any disclaimer, the term of this patent is extended or adjusted under 35 U.S.C. 154(b) by 68 days.

This patent is subject to a terminal disclaimer.

(21) Appl. No.: 13/410,532

(22) Filed: Mar. 2, 2012

Related U.S. Application Data

(63) Continuation-in-part of application No. 11/472,179, filed on Jun. 20, 2006, now Pat. No. 8,154,385.

(60) Provisional application No. 60/713,304, filed on Aug. 31, 2005.

(51) Int. Cl.
*H04Q 5/22* (2006.01)

(52) U.S. Cl.
USPC ........................................ 340/10.1; 340/572.1

(58) Field of Classification Search
USPC ............................................. 340/10.1, 572.1
See application file for complete search history.

(56) References Cited

U.S. PATENT DOCUMENTS

| | | | |
|---|---|---|---|
| 6,308,228 B1 * | 10/2001 | Yocum et al. | 710/52 |
| 2002/0120929 A1 * | 8/2002 | Schwalb et al. | 725/32 |
| 2003/0001009 A1 * | 1/2003 | Collins et al. | 235/385 |
| 2004/0165564 A1 * | 8/2004 | Kim et al. | 370/338 |
| 2004/0172658 A1 * | 9/2004 | Rakib et al. | 725/120 |
| 2006/0176152 A1 * | 8/2006 | Wagner et al. | 340/10.2 |
| 2006/0232408 A1 * | 10/2006 | Nycz et al. | 340/572.1 |
| 2007/0024424 A1 * | 2/2007 | Powell | 340/10.1 |
| 2007/0207792 A1 * | 9/2007 | Loving | 455/418 |

* cited by examiner

*Primary Examiner* — Brian Zimmerman
*Assistant Examiner* — Omer S Khan
(74) *Attorney, Agent, or Firm* — Turk IP Law, LLC

(57) ABSTRACT

Radio frequency identification (RFID) tags are selected for inventorying using a combination of preselect and/or post select criteria. The selection commands can be for selecting according to a tag memory content, by invoking the mask address or by comparing other tag characteristics. Selection criteria can be determined locally at a modem block of a reader or provided to the modem block by higher layers of the reader. Tags meeting the selection criteria are reported to the higher layers for further actions. Some tags may be held while waiting for instructions from the higher layer block(s). The instructions may involve one or more access operations, which may be performed using a higher transmit power than other operations.

18 Claims, 19 Drawing Sheets

*MODEM CHECKING TAG EPC BEFORE REPORTING TAG TO AP / SERVER / CONTROLLER SW*

*RFID READER COMMUNICATING WITH A POPULATION OF TAGS*

*RFID READER COMMUNICATING WITH A POPULATION OF TAGS*

*RFID READER SELECTING SUBPOPULATION OF TAGS*

RFID READER ACCESSING A SINGULATED TAG

*AP – MODEM INTERFACE*

*AP – MODEM INTERFACE COMMANDS*

769 TAG MEMORY ADDRESSES
BY FUNCTION

[OTHER USER DATA]
[FOR SENSOR DATA]
[OTHER USER DATA]
⋮

TID [15:0]
TID [31:16]

EPC [15:0]
⋮
EPC [N:n-15]
PC [15:0]
CRC-16 [15:0]

760 IN TAG MEMORY

762 USER
764 TID
766 EPC
768 RESERVED

*TAG DATA MAPPING*

779 LOCAL LIST OF TIDs

TID-1
TID-2
⋮
TID-N

757

AP LOCAL DATABASE

*LOCAL DATABASE OF EXAMPLE TIDs*

LOCAL PROCESSING OF RECEIVED RFID TAG RESPONSES

RELATED APPLICATIONS

This utility patent application is a continuation-in-part of U.S. patent application Ser. No. 11/472,179 filed on Jun. 20, 2006, which claims the benefit of U.S. Provisional Application Ser. No. 60/713,304 filed on Aug. 31, 2005. The foregoing applications are hereby incorporated herein by reference.

BACKGROUND

Radio Frequency IDentification (RFID) systems typically include RFID tags and RFID readers (the latter are also known as RFID reader/writers or RFID interrogators). RFID systems can be used in many ways for locating and identifying objects to which the tags are attached. RFID systems are particularly useful in product-related and service-related industries for tracking large numbers of objects being processed, inventoried, or handled. In such cases, an RFID tag is usually attached to an individual item, or to its package.

In principle, RFID techniques entail using an RFID reader to interrogate one or more RFID tags. The reader transmitting a Radio Frequency (RF) wave performs the interrogation. A tag that senses the interrogating RF wave responds by transmitting back another RF wave. The tag generates the transmitted back RF wave either originally, or by reflecting back a portion of the interrogating RF wave in a process known as backscatter. Backscatter may take place in a number of ways.

The reflected-back RF wave may further encode data stored internally in the tag, such as a number. The response is demodulated and decoded by the reader, which thereby identifies, counts, or otherwise interacts with the associated item. The decoded data can denote a serial number, a price, a date, a destination, other attribute(s), any combination of attributes, and so on.

An RFID tag typically includes an antenna system, a power management section, a radio section, and frequently a logical section, a memory, or both. In earlier RFID tags, the power management section included an energy storage device, such as a battery. RFID tags with an energy storage device are known as active tags. Advances in semiconductor technology have miniaturized the electronics so much that an RFID tag can be powered solely by the RF signal it receives. Such RFID tags do not include an energy storage device, and are called passive tags.

In typical applications, responses from the RFID tags may be forwarded to a remote processor, such as a controller, which processes the responses, determines which actions are to be taken, and directs the RFID reader accordingly. In a dynamic environment, where tags enter and leave a field of view of the RFID reader, respond with varying reliability, and so on, valuable processing time may be lost in transmitting tag responses to the remote processor and waiting for a decision.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Embodiments are directed to an RFID system comprising of layers such as a modem layer, an application processor layer, a server layer, a controller layer, and the like. An RFID reader is configured to start an inventory operation of tags including any set or combination of preselect and/or post select operations. Individual or logic combinations of select commands may be transmitted to the tags for determining whether a tag meets a selection criterion or not.

A preselect criterion may be used to discard tags that do not meet the criterion. The post select criterion may be used to determine tags that are categorized as an exception and as such handled by higher levels for further operations. This eliminates the need to process each tag by the full reader system.

The selection process may be performed by comparing a tag memory content or a characteristic of a tag response to a list of mask values from a local database. The selection criteria may be provided to the modem layer from higher layers or generated by the modem layer in response to instructions from the higher layers.

According to some embodiments, tags meeting the criterion may be held while the modem layer awaits instructions from the higher layers for further operations. An optional read operation may also be performed prior to determining whether or not the tag meets the criterion.

In some embodiments, the further operations may include one or more access operations for accessing tags meeting the criterion. In response, the modem layer and/or higher layers may determine if reader transmit power should be increased to perform the access operation(s). If so, the modem layer may increase the reader transmit power, perform the access operation(s), then decrease the transmit power.

This and other features and advantages of the invention will be better understood in view of the Detailed Description and the Drawings.

BRIEF DESCRIPTION OF THE DRAWINGS

Non-limiting and non-exhaustive embodiments are described with reference to the following drawings.

DETAILED DESCRIPTION

Figure 1:
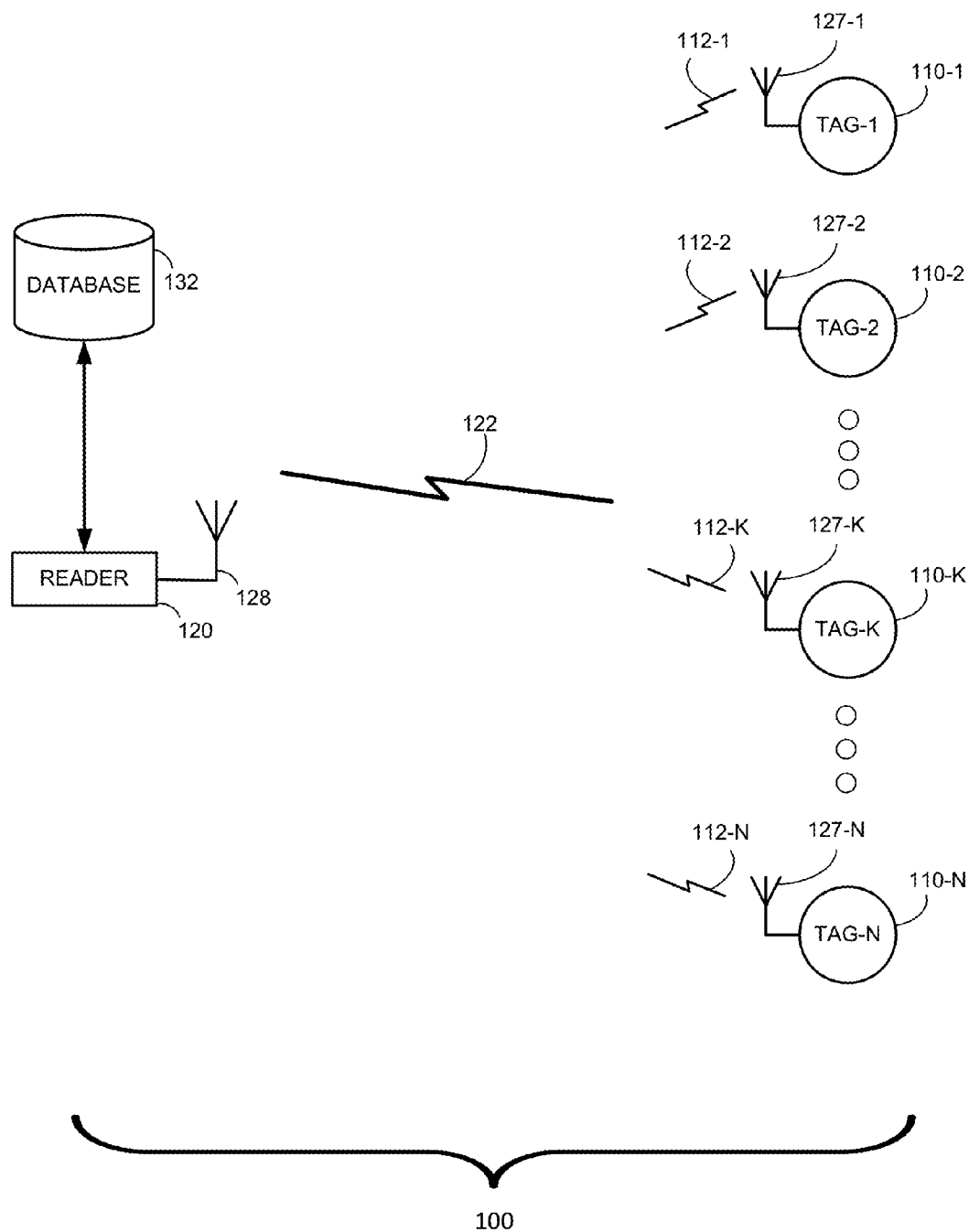
FIG. 1 is a diagram of an example RFID system including an RFID reader communicating with RFID tags in its field of view.

Various embodiments will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed subject matter.

Throughout the specification and claims, the following terms take at least the meanings explicitly associated herein, unless the context clearly dictates otherwise. The meanings identified below are not intended to limit the terms, but merely provide illustrative examples for the terms. The meaning of "a," "an," and "the" includes plural reference, the meaning of "in" includes "in" and "on." The term "connected" means a direct electrical connection between the items connected, without any intermediate devices. The term "coupled" means either a direct electrical connection between the items connected or an indirect connection through one or more passive or active intermediary devices. The term "circuit" means either a single component or a multiplicity of components, either active and/or passive, that are coupled together to provide a desired function. The term "signal" means at least one current, voltage, charge, temperature, data, or other measurable quantity. The terms "RFID reader" and "RFID tag" are used interchangeably with the terms "reader" and "tag", respectively, throughout the text and claims. The terms "command size" and "command length" are used interchangeably throughout the text and claims. While this description is mostly in terms of commands, that is only intended as an example, and it is intended to apply also to more generalized words.

FIG. 1 is a diagram of an example RFID system 100, incorporating aspects of the invention. System 100 includes an RFID reader 120 and N RFID tags 110-1, 110-2, ..., 110-K, ..., 110-N in the vicinity of each other and of reader 120.

RFID reader 120 has an antenna 128, and may be in communication with database 132. Reader 120 transmits an interrogating Radio Frequency (RF) wave 122, which can be perceived by tags 110-1, 110-2, ..., 110-K, ..., 110-N.

RFID tags 110-X (X here stands for 1, 2, ..., K, ..., N) can be passive tags or active tags, i.e. tags having their own power source. Where tags 110-X are passive tags, they are powered from wave 122. Each tag 110-X includes an antenna 127-X. Upon sensing interrogating RF wave 122, each tag 110-X may generate a wave 112-X in response. RFID reader 120 senses and interprets waves 112-X.

In FIG. 1, as in other figures, interrogating RF wave 122 is shown as larger than waves 112-X. This is to signify that interrogating RF wave 122 typically has a higher intensity than response wave 112-X.

Reader 120 and tag 110-K thus exchange data via waves 122 and 112-K. In a session of such an exchange, each encodes, modulates, and transmits data to the other, and each receives, demodulates, and decodes data from the other. The data is modulated onto, and decoded from, RF waveforms, as will be seen in more detail below.

Encoding the data can be performed in a number of different ways. For example, protocols are devised to communicate in terms of symbols, also called RFID symbols. A symbol for communicating can be a preamble, a null symbol, a symbol 0, a symbol 1, and so on. Further symbols can be implemented for ultimately exchanging binary data, such as "0" and "1", if that is desired.

In addition, groups of these bits and/or symbols are named according to their function. For example, it is customary to refer to such groups as "commands", "data", "payload", "handle", and so on.

Figure 2:
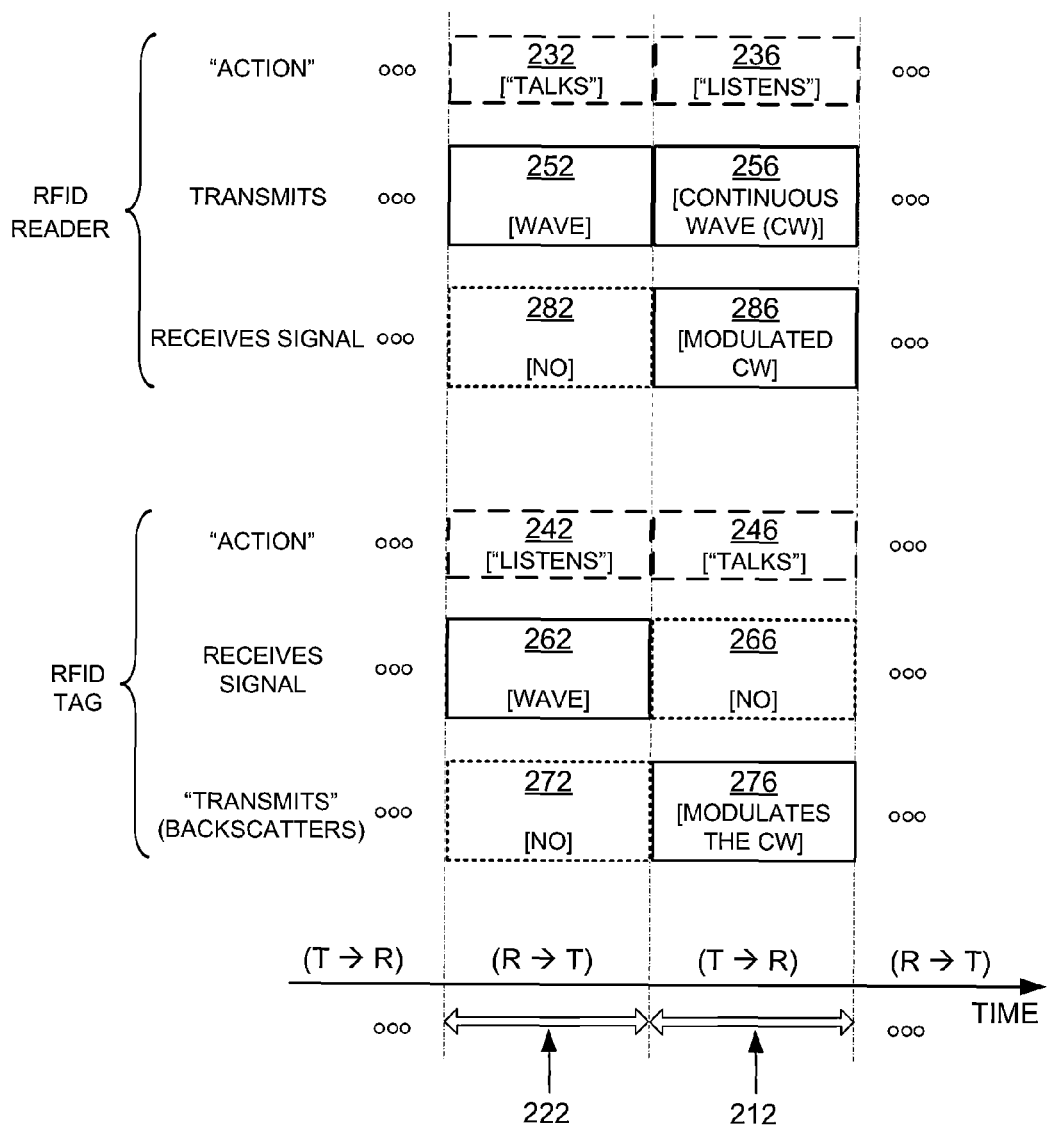
FIG. 2 is a conceptual diagram for explaining a half-duplex mode of communication between the components of the RFID system of FIG. 1.

FIG. 2 is a conceptual diagram 200 for explaining the half-duplex mode of communication between the components of the RFID system of FIG. 1. The explanation is made with reference to a TIME axis, and also to a human metaphor of "talking" and "listening". The actual technical implementations for "talking" and "listening" are now described.

RFID reader 120 and RFID tags 110-X talk and listen to each other by taking turns. As seen on axis TIME, when reader 120 talks to tag 110-K the communication session is designated as "R→T", and when tag 110-K talks to reader 120 the communication session is designated as "T→R". Along the TIME axis, a sample R→T communication session occurs during a time interval 212, and a following sample T→R communication session occurs during a time interval 226. Of course intervals 212, 226 can be of different durations—here the durations are shown approximately equal only for purposes of illustration.

According to blocks 232 and 236, RFID reader 120 talks during interval 212, and listens during interval 226. According to blocks 242 and 246, RFID tag 110-K listens while reader 120 talks (during interval 212), and talks while reader 120 listens (during interval 226).

In terms of actual technical behavior, during interval 212, reader 120 talks to tag 110-K as follows. According to block 252, reader 120 transmits wave 122, which was first described in FIG. 1. At the same time, according to block 262, tag 110-K receives wave 122 and processes it. Meanwhile, according to block 272, tag 110-K does not backscatter with its antenna, and according to block 282, reader 120 has no wave to receive from tag 110-K.

During interval 226, tag 110-K talks to reader 120 as follows. According to block 256, reader 120 transmits a Continuous Wave (CW), which can be thought of as a carrier signal that ideally encodes no information. As discussed before, this carrier signal serves both to be harvested by tag 110-K for its own internal power needs, and also as a wave that tag 110-K can backscatter. Indeed, during interval 226, according to block 266, tag 110-K does not receive a signal for processing. Instead, according to block 276, tag 110-K modulates the CW emitted according to block 256, so as to generate backscatter wave 112-K. Concurrently, according to block 286, reader 120 receives backscatter wave 112-K and processes it.

In the above, an RFID reader/interrogator may communicate with one or more RFID tags in any number of ways. Some such ways are called protocols. A protocol is a specification that calls for specific manners of signaling between the reader and the tags.

One such protocol is called the Specification for RFID Air Interface—EPC (TM) Radio-Frequency Identity Protocols Class-1 Generation-2 UHF RFID Protocol for Communications at 860 MHz-960 MHz, which is also colloquially known as "the Gen2 Spec", version 1.2.0 of which is hereby incorporated by reference in its entirety. The Gen2 Spec has been ratified by EPCglobal, which is an organization that maintains a website at: <http://www.epcglobalinc.org/> at the time this document is initially filed with the USPTO.

It was described above how reader 120 and tag 110-K communicate in terms of time. In addition, communications between reader 120 and tag 110-K may be restricted according to frequency. One such restriction is that the available frequency spectrum may be partitioned into divisions that are called channels. Different partitioning manners may be specified by different regulatory jurisdictions and authorities (e.g. FCC in North America, CEPT in Europe, etc.).

The reader 120 typically transmits with a transmission spectrum that lies within one channel. In some regulatory jurisdictions the authorities permit aggregating multiple channels into one or more larger channels, but for all practical purposes an aggregate channel can again be considered a single, albeit larger, individual channel.

Tag 110-K can respond with a backscatter that is modulated directly onto the frequency of the reader's emitted CW, also called baseband backscatter. Alternatively, Tag 110-K can respond with a backscatter that is modulated onto a frequency, developed by Tag 110-K, that is different from the reader's emitter CW, and this modulated tag frequency is then impressed upon the reader's emitted CW. This second type of backscatter is called subcarrier backscatter. The subcarrier frequency can be within the reader's channel, can straddle the boundaries with the adjacent channel, or can be wholly outside the reader's channel.

A number of jurisdictions require a reader to hop to a new channel on a regular basis. When a reader hops to a new channel it may encounter RF energy there that could interfere with communications.

Embodiments of the present disclosure can be useful in different RFID environments, for example, in the deployment of RFID readers in sparse- or dense-reader environments, in environments with networked and disconnected readers such as where a hand-held reader may enter the field of networked readers, in environments with mobile readers, or in environments with other interference sources. It will be understood that the present embodiments are not limited to operation in the above environments, but may provide improved operation in such environments.

Figure 3A:
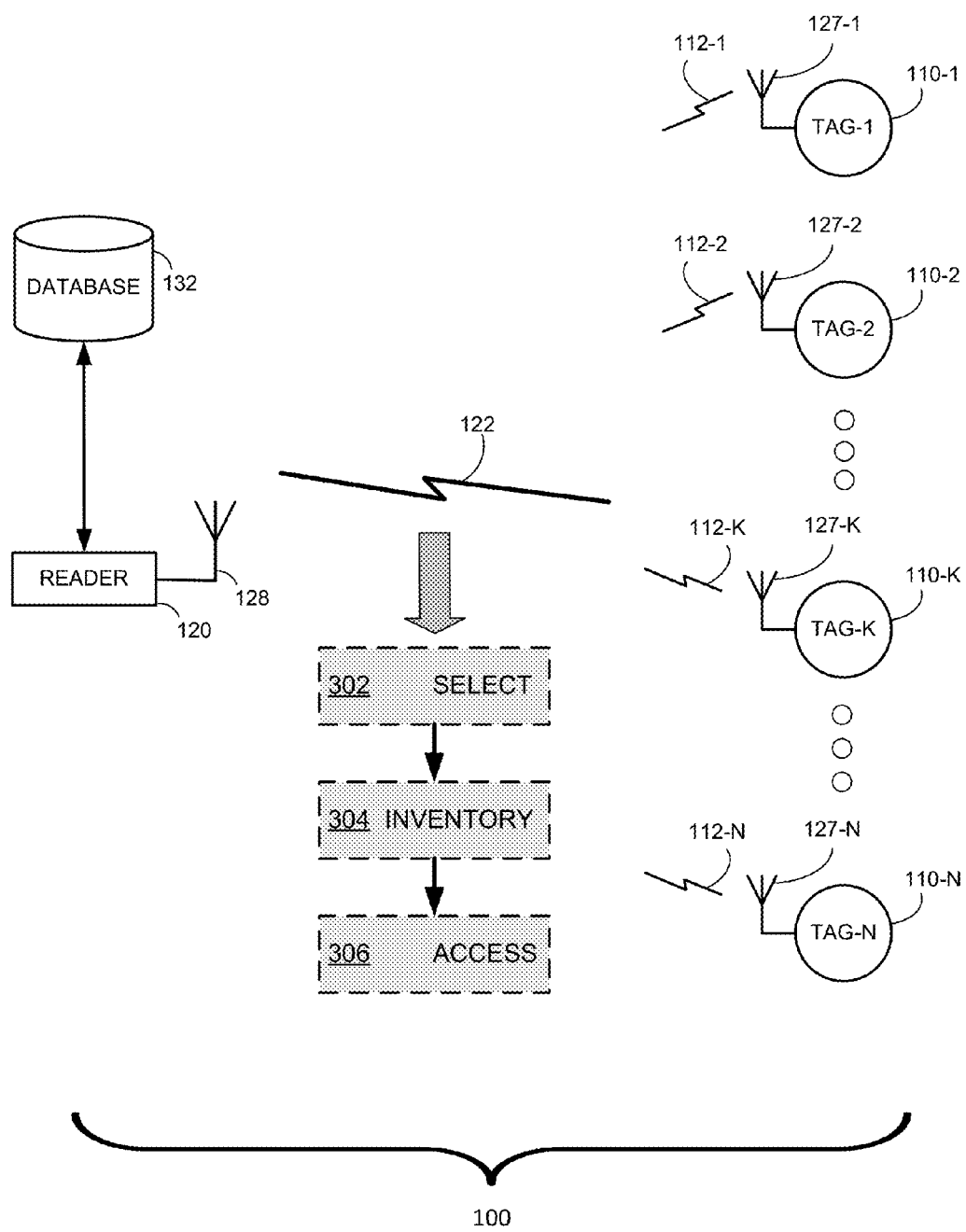
FIG. 3A is a diagram of the system of FIG. 1, further showing operations that the reader might perform with the tags.

FIG. 3A is a diagram of the system of FIG. 1, further showing operations that the reader might perform with the tags. In FIG. 3A, three example operations are shown. Select (302) is an optional step prior to (or as part of) inventorying tag 110-X. Inventory 304 is an operation, where reader 120 identifies individual tags. Access 306 is an operation, where the reader transacts with individual tags. In most protocols Inventory 304 is a required step prior to Access 306.

Many RFID protocols have a way to select individual tags or populations of tags prior to inventorying the tag or tags. For example, the Gen2 spec has a Select command that a reader issues prior to starting an inventory round. Deterministic protocols (such as Class-0) allow a reader to navigate only desired EPCs of the tag population.

Selecting allows a reader to choose which tags it wants to talk to, and partitions a tag population before inventory, thereby accelerating the inventory process (typically, unwanted tags do not respond). Selecting also allows readers to treat tags like records in a database. Multiple Select commands may be implemented using a Boolean operation on a tag population, such as union (U), intersection (∩), and negation (~) for partitioning of tag populations.

Figure 3B:
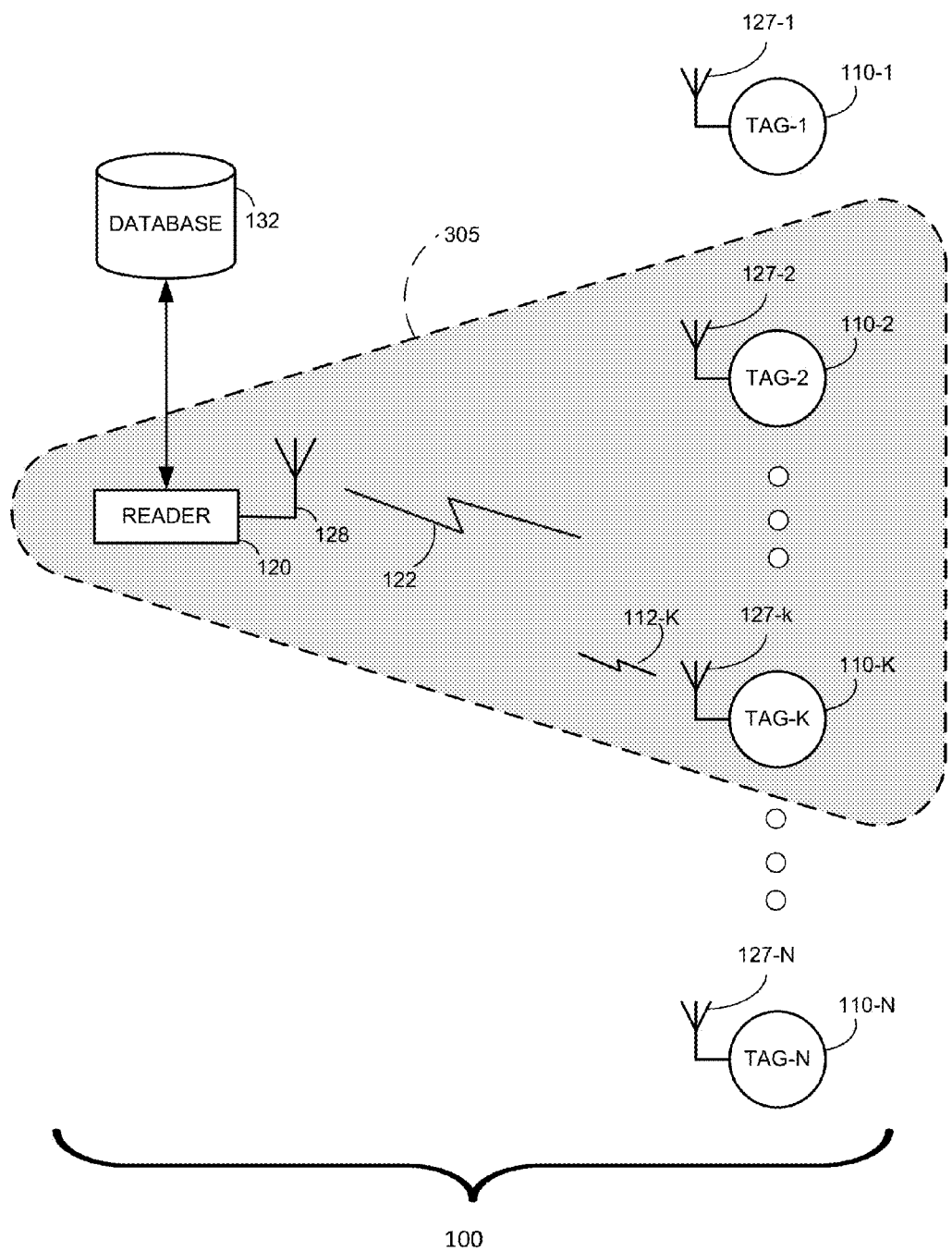
FIG. 3B is a diagram of the RFID system of FIG. 1 with the RFID reader selecting a subpopulation of tags.

FIG. 3B illustrates the RFID system 100, which was first presented in FIG. 1. In addition, a sub-population of RFID tags comprising tags 110-2 through 110-K have been selected by reader 120, as shown by relationship 305. This selection enables reader 120 to singulate and access an RFID tag, such as tag 110-K, from among a smaller group of tags based on predetermined criteria.

In one embodiment, the criteria may be a flag being set by the tag in response to a comparison of a mask value received from the reader with sensor data stored at a mask address.

Figure 3C:
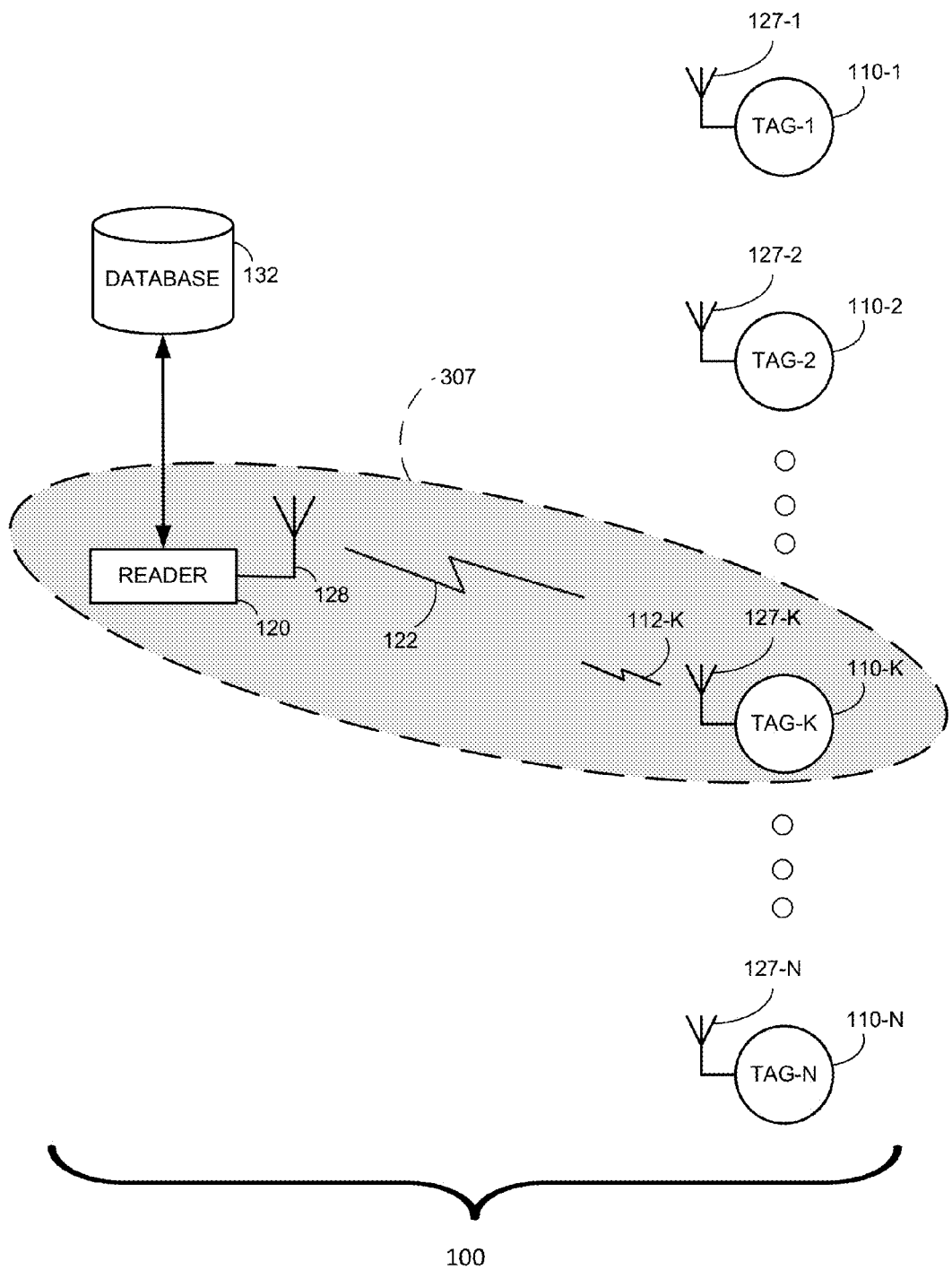
FIG. 3C is a diagram of the RFID system of FIG. 1 with the RFID reader accessing a singulated tag.

FIG. 3C illustrates the RFID system 100, which was first presented in FIG. 1. In addition, RFID tag 110-K has been singulated by reader 120, as shown by relationship 307. This singulation has caused all tags 110-X except tag 110-K to not transmit, so that reader 120 and singulated tag 110-K can exchange data without interference and reader 120 can access tag 110-K.

Reader 120 has accomplished singulation by first issuing appropriate commands, which have caused tags 110-X to transition to appropriate internal states. In this example, at least tag 110-K is in a state where it can receive an access-type command, while the remaining tags are in states where generally they do not respond or take action, until reader 120 and singulated tag 110-K complete their exchanges.

The term singulation, as used for the present document, generally means a process for distinguishing a tag from other tags. As such, singulation may be unnecessary when a single reader is addressing a single tag, or where there is no interference from, or concern about any other RFID components such as other RFID tags. The term singulation, as used here, may by coincidence be functionally the same as a specific term "singulation", which means a process of a reader that can be performed with many or even a single tag.

The term accessing, as used for the present document, generally means a process for retrieving information stored at the tag and/or causing information stored at the tag to be modified. This may include receiving an identifier symbol, user-specified data, and the like, from the tag, as well as storing a new identifier symbol etc. at the tag. Accessing may further include causing one or more operational parameters of the tag to be changed such as a security mechanism.

Figure 4:
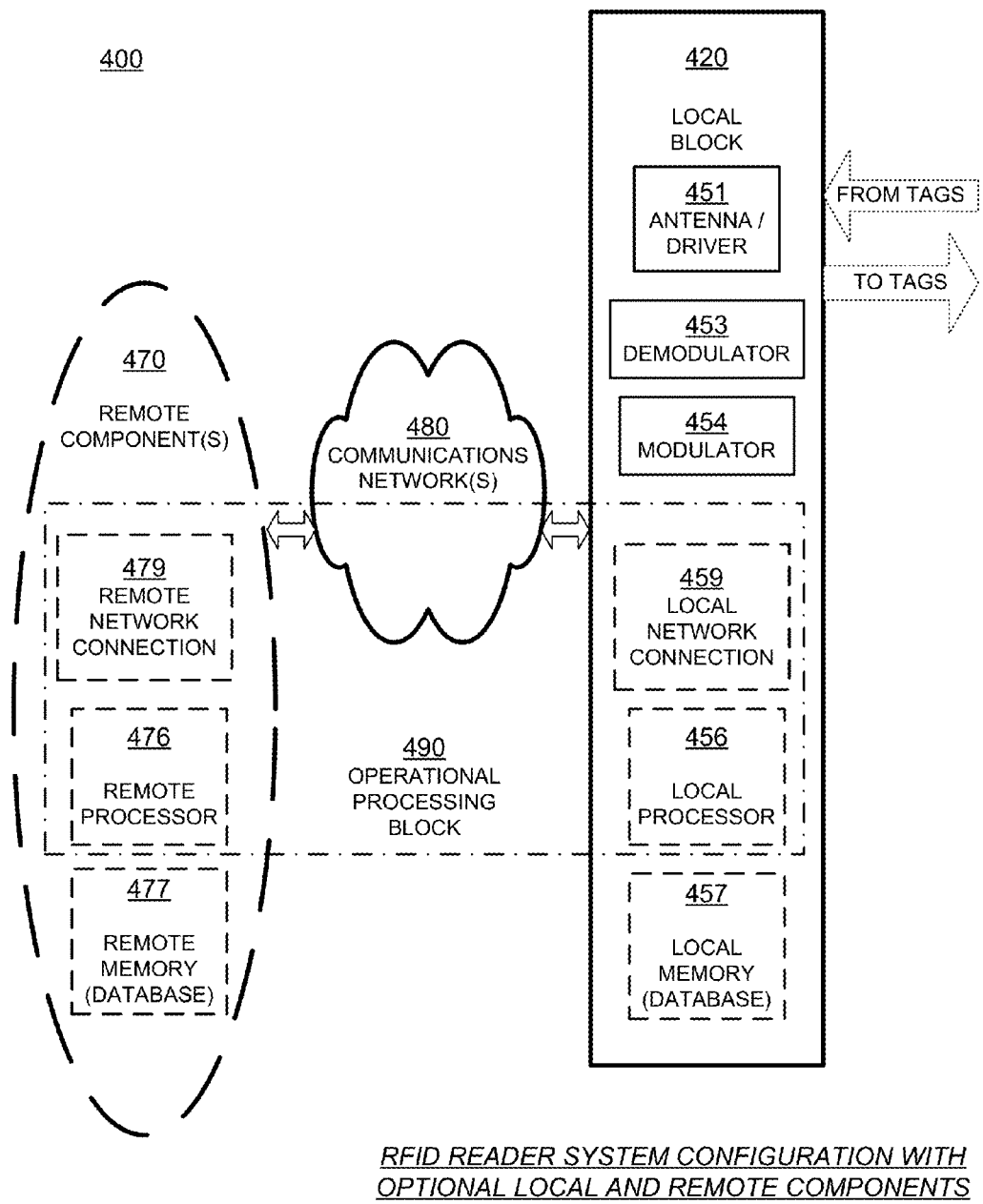
FIG. 4 is a block diagram of an RFID reader system according to embodiments.

FIG. 4 is a block diagram of a whole RFID reader system 400 according to embodiments. System 400 includes a local block 420, and optionally remote components 470. Local block 420 and remote components 470 can be implemented in any number of ways. It will be recognized that reader 120 of FIG. 1 is the same as local block 420, if remote components 470 are not provided. Alternately, reader 120 can be implemented instead by system 400, of which only the local block 420 is shown in FIG. 1.

Local block 420 is responsible for communicating with the tags. Local block 420 includes a block 451 of an antenna and a driver of the antenna for communicating with the tags. Some readers, like that shown in local block 420, contain a single antenna and driver. Some readers contain multiple antennas and drivers and a method to switch signals among them, including sometimes using different antennas for transmitting and for receiving. And some readers contain multiple antennas and drivers that can operate simultaneously. A demodulator/decoder block 453 demodulates and decodes backscattered waves received from the tags via antenna block 451. Modulator/encoder block 454 encodes and modulates an RF wave that is to be transmitted to the tags via antenna block 451.

Local block 420 additionally includes an optional local processor 456. Processor 456 may be implemented in any number of ways known in the art. Such ways include, by way of examples and not of limitation, digital and/or analog processors such as microprocessors and digital-signal processors (DSPs); controllers such as microcontrollers; software running in a machine such as a general purpose computer; programmable circuits such as Field Programmable Gate Arrays (FPGAs), Field-Programmable Analog Arrays (FPAAs), Programmable Logic Devices (PLDs), Application Specific Integrated Circuits (ASIC), any combination of one or more of these; and so on. In some cases some or all of the decoding function in block 453, the encoding function in block 454, or both, may be performed instead by processor 456.

Local block 420 additionally includes an optional local memory 457. Memory 457 may be implemented in any number of ways known in the art. Such ways include, by way of examples and not of limitation, nonvolatile memories (NVM), read-only memories (ROM), random access memories (RAM), any combination of one or more of these, and so on. Memory 457, if provided, can include programs for processor 456 to run, if provided.

In some embodiments, memory 457 stores data read from tags, or data to be written to tags, such as Electronic Product Codes (EPCs), Tag Identifiers (TIDs) and other data. Memory 457 can also include reference data that is to be compared to the EPC codes, instructions and/or rules for how to encode commands for the tags, modes for controlling antenna 451, and so on. In some of these embodiments, local memory 457 is provided as a database.

Some components of local block 420 typically treat the data as analog, such as the antenna/driver block 451. Other components such as memory 457 typically treat the data as digital. At some point there is a conversion between analog and digital. Based on where this conversion occurs, a whole reader may be characterized as "analog" or "digital", but most readers contain a mix of analog and digital functionality.

If remote components 470 are indeed provided, they are coupled to local block 420 via an electronic communications network 480. Network 480 can be a Local Area Network (LAN), a Metropolitan Area Network (MAN), a Wide Area Network (WAN), a network of networks such as the internet, and so on. In turn, local block 420 then includes a local network connection 459 for communicating with network 480.

There can be one or more remote component(s) 470. If more than one, they can be located at the same place with each other, or in different places. They can access each other and local block 420 via network 480, or via other similar networks, and so on. Accordingly, remote component(s) 470 can use respective remote network connections. Only one such remote network connection 479 is shown, which is similar to local network connection 459, etc.

Remote component(s) 470 can also include a remote processor 476. Processor 476 can be made in any way known in the art, such as was described with reference to local processor 456.

Remote component(s) 470 can also include a remote memory 477. Memory 477 can be made in any way known in the art, such as was described with reference to local memory 457. Memory 477 may include a local database, and a different database of a Standards Organization, such as one that can reference EPCs.

Of the above-described elements, it is advantageous to consider a combination of these components, designated as operational processing block 490. Block 490 includes those that are provided of the following: local processor 456, remote processor 476, local network connection 459, remote network connection 479, and by extension an applicable portion of network 480 that links connection 459 with connection 479. The portion can be dynamically changeable, etc. In addition, block 490 can receive and decode RF waves received via antenna 451, and cause antenna 451 to transmit RF waves according to what it has processed.

Block 490 includes either local processor 456, or remote processor 476, or both. If both are provided, remote processor 476 can be made such that it operates in a way complementary with that of local processor 456. In fact, the two can cooperate. It will be appreciated that block 490, as defined this way, is in communication with both local memory 457 and remote memory 477 if both are present.

Accordingly, block 490 is location agnostic, in that its functions can be implemented either by local processor 456, or by remote processor 476, or by a combination of both. Some of these functions are preferably implemented by local processor 456, and some by remote processor 476. Block 490 accesses local memory 457, or remote memory 477, or both for storing and/or retrieving data.

Reader system 400 operates by block 490 generating communications for RFID tags. These communications are ultimately transmitted by antenna block 451, with modulator/encoder block 454 encoding and modulating the information on an RF wave. Then data is received from the tags via antenna block 451, demodulated and decoded by demodulator/decoder block 453, and processed by processing block 490.

Embodiments additionally include programs, and methods of operation of the programs. A program is generally defined as a group of steps or operations leading to a desired result, due to the nature of the elements in the steps and their sequence. A program is usually advantageously implemented as a sequence of steps or operations for a processor, such as the structures described above.

Performing the steps, instructions, or operations of a program requires manipulation of physical quantities. Usually, though not necessarily, these quantities may be transferred, combined, compared, and otherwise manipulated or processed according to the steps or instructions, and they may also be stored in a computer-readable medium. These quantities include, for example, electrical, magnetic, and electromagnetic charges or particles, states of matter, and in the more general case can include the states of any physical devices or elements. It is convenient at times, principally for reasons of common usage, to refer to information represented by the states of these quantities as bits, data bits, samples, values, symbols, characters, terms, numbers, or the like. It should be borne in mind, however, that all of these and similar terms are associated with the appropriate physical quantities, and that these terms are merely convenient labels applied to these physical quantities, individually or in groups.

Embodiments furthermore include storage media. Such media, individually or in combination with others, have stored thereon instructions of a program made according to the invention. A storage medium according to the invention is a computer-readable medium, such as a memory, and is read by a processor of the type mentioned above. If a memory, it can be implemented in a number of ways, such as Read Only Memory (ROM), Random Access Memory (RAM), etc., some of which are volatile and some non-volatile.

Even though it is said that the program may be stored in a computer-readable medium, it should be clear to a person skilled in the art that it need not be a single memory, or even a single machine. Various portions, modules or features of it may reside in separate memories, or even separate machines. The separate machines may be connected directly, or through a network such as a local access network (LAN) or a global network such as the Internet.

Often, for the sake of convenience only, it is desirable to implement and describe a program as software. The software can be unitary, or thought in terms of various interconnected distinct software modules.

This detailed description is presented largely in terms of flowcharts, algorithms, and symbolic representations of operations on data bits on and/or within at least one medium that allows computational operations, such as a computer with memory. Indeed, such descriptions and representations are the type of convenient labels used by those skilled in programming and/or the data processing arts to effectively convey the substance of their work to others skilled in the art. A person skilled in the art of programming may use these descriptions to readily generate specific instructions for implementing a program according to the embodiments.

Embodiments of an RFID reader system can be implemented as a combination of hardware and software. It is advantageous to consider such a system as subdivided into components or modules. A person skilled in the art will recognize that some of these components or modules can be implemented as hardware, some as software, some as firmware, and some as a combination. An example of such a subdivision is now described.

Figure 5:
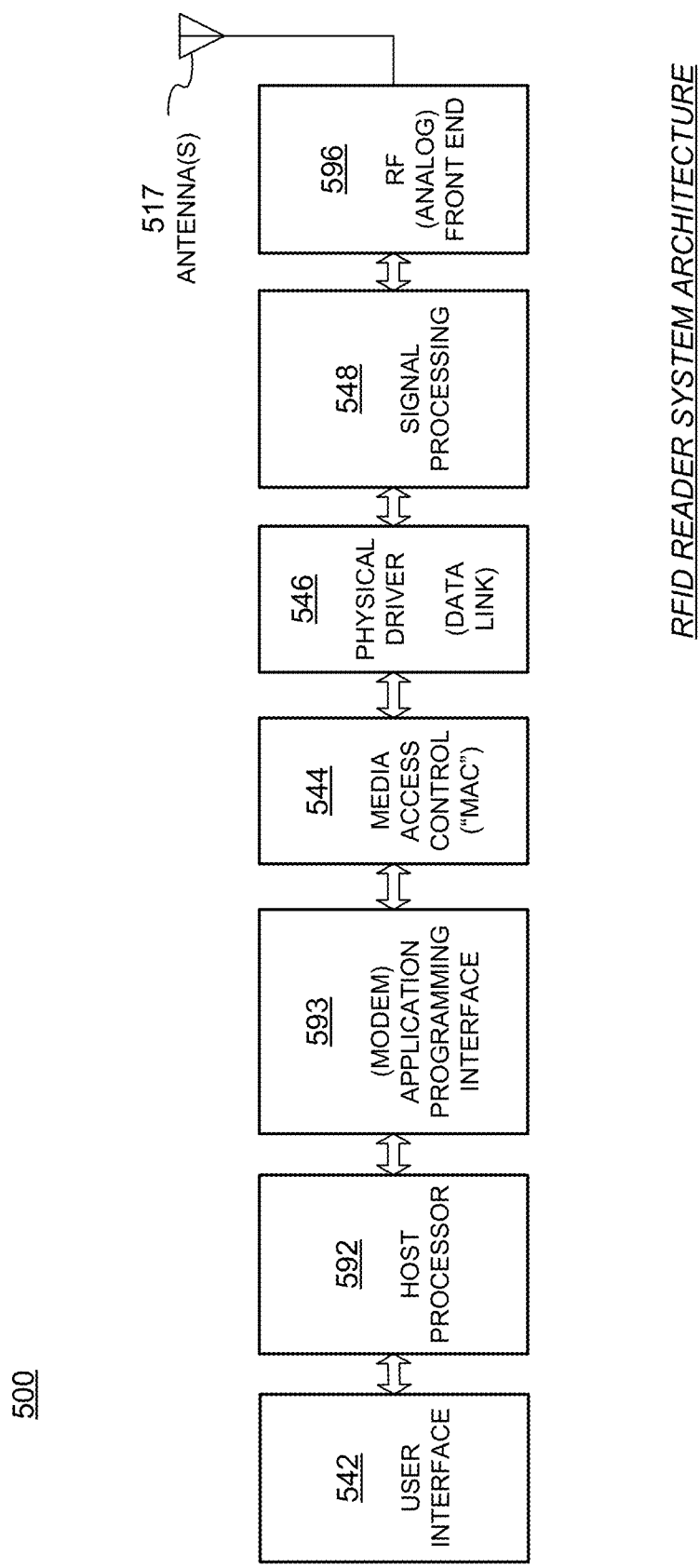
FIG. 5 is a block diagram illustrating major functional blocks of an RFID reader system.

FIG. 5 is a block diagram illustrating an overall architecture of a RFID reader system 500 according to embodiments. It will be appreciated that system 500 is considered subdivided into modules or components. Each of these modules may be implemented by itself, or in combination with others. It will be recognized that some aspects are parallel with those of FIG. 4. In addition, some of them may be present more than once.

RFID reader system 500 includes one or more antennas 517, and an RF Front End 596, for interfacing with antenna(s) 517. These can be made as described above. In addition, Front End 596 typically includes analog components.

System 500 also includes a Signal Processing module 548. In this embodiment, module 548 exchanges waveforms with Front End 596, such as I and Q waveform pairs. In some embodiments, signal processing module 548 is implemented by itself in an FPGA.

System 500 also includes a Physical Driver module 546, which is also known as Data Link. In this embodiment, module 546 exchanges bits with module 548. Data Link 546 can be the stage associated with framing of data. In one embodiment, module 546 is implemented by a Digital Signal Processor.

System 500 additionally includes a Media Access Control module 544, which is also known as MAC layer. In this embodiment, module 544 exchanges packets of bits with module 546. MAC layer 544 can be the stage for making decisions for sharing the medium of wireless communication, which in this case is the air interface. Sharing can be between reader system 500 and tags, or between system 500 with another reader, or between tags, or a combination. In one embodiment, module 544 is implemented by a Digital Signal Processor.

System 500 moreover includes an Application Programming Interface module 593, which is also known as API, Modem API, Mach1, and MAPI. In some embodiments, module 593 is itself an interface for a user.

System 500 further includes a host processor 592. Processor 592 exchanges signals with MAC layer 544 via module 593. In some embodiments, host processor 592 is not considered as a separate module, but one that includes some of the above-mentioned modules of system 500. A user interface 542 is coupled to processor 592, and it can be manual, automatic, or both.

Host processor 592 can include applications for system 500. In some embodiments, elements of module 593 may be distributed between processor 592 and MAC layer 544.

It will be observed that the modules of system 500 form something of a chain. Adjacent modules in the chain can be coupled by the appropriate instrumentalities for exchanging signals. These instrumentalities include conductors, buses, interfaces, and so on. These instrumentalities can be local, e.g. to connect modules that are physically close to each other, or over a network, for remote communication.

The chain is used in opposite directions for receiving and transmitting. In a receiving mode, wireless waves are received by antenna(s) 517 as signals, which are in turn processed successively by the various modules in the chain. Processing can terminate in any one of the modules. In a transmitting mode, initiation can be in any one of these modules. That, which is to be transmitted becomes ultimately signals for antenna(s) 517 to transmit as wireless waves.

The architecture of system 500 is presented for purposes of explanation, and not of limitation. Its particular subdivision into modules need not be followed for creating embodiments according to the invention. Furthermore, the features of the invention can be performed either within a single one of the modules, or by a combination of them.

An RFID reader system according to embodiments includes a first layer and a second layer, where the first layer is configured to receive a particular one of the responses, determine whether the particular response meets a post select criterion, and hand off control to the second layers if the criterion is met. The first layer then waits until control is returned to it, and then receives a second one of the responses.

The first layer may be a modem that also includes a Media Access Control layer. Furthermore, the second layer may be a host processor, and the first layer and the second layer may communicate through a Modem Application Programming Interface (MAPI).

The first layer may be a software implemented modem or a hardware implemented modem. Similarly, the second layer may be a software implemented application processor or a hardware implemented application processor. In some embodiments, the first layer and the second layer may be integrated. Moreover, the first layer may also include an analog interface module.

According to other embodiments, the first criterion may be a preselect criterion and include matching of a tag memory content to a local database content associated with the first layer. The second criterion may be a post select criterion and include matching of a tag memory content or a tag characteristic to a local database content associated with the second layer. The first layer may be further configured to report to the second layer at least a portion of the particular response always or only if it meets a reporting condition.

According to further embodiments, the reporting condition may be a preselect criterion or a logic combination of criteria, which may include comparing the particular response to a mask. The first layer may also be configured to read the RFID tag that provided the particular response before determining whether the post select criterion is met based on a characteristic of the post select criterion. The post select criterion may be received at the first layer from the second layer.

According to yet other embodiments, the first layer may determine whether the particular response meets a preselect criterion or a logic combination of preselect criteria, and apply the post select criterion only if the preselect criteria are met. The particular response may be discarded if it does not meet the preselect criteria.

Furthermore, the first layer may perform a read operation on the RFID tag that provided the particular response before determining whether the preselect criterion is met, as the preselect criterion may be in a memory area that can only be obtained via a direct read of the tag memory.

In some embodiments, the first layer may set a reader transmit power level based on instructions from a higher layer or suitable reader, tag, and environmental parameters. Transmit power level selection is described in more detail below in relation to FIGS. 13 and 14.

Figure 6A:
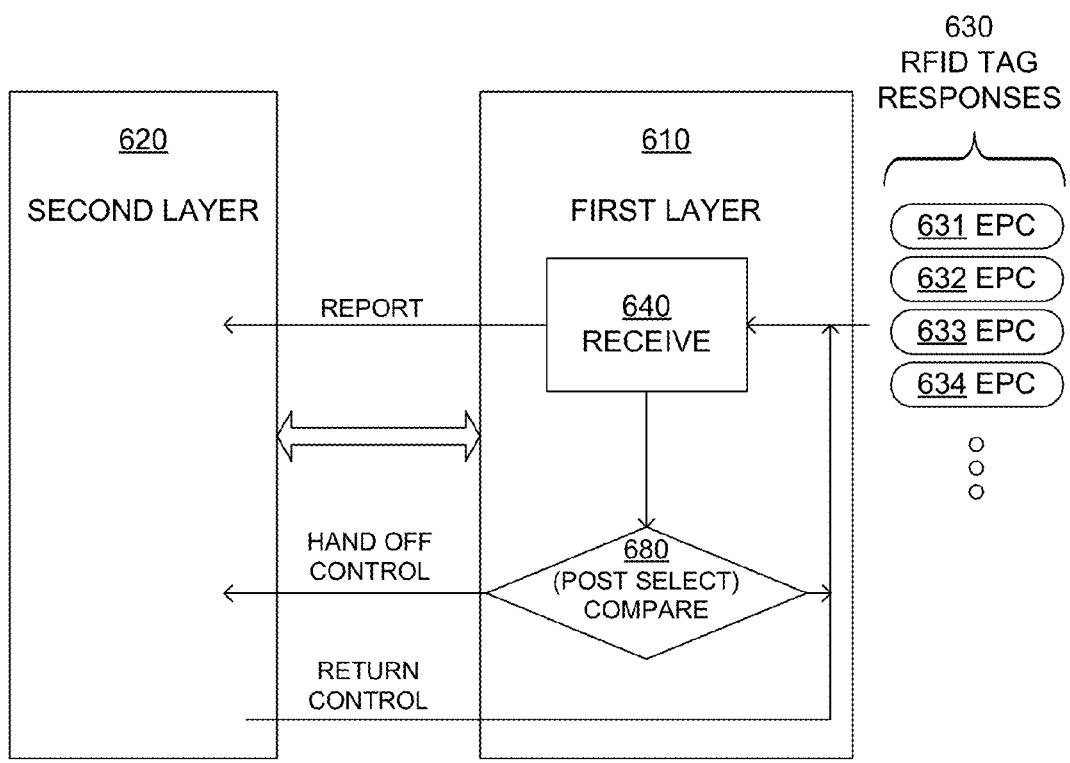
FIG. 6A is a partial block diagram of an RFID reader system for illustrating exception processing according to embodiments.

FIG. 6A is a partial block diagram of an RFID reader system for illustrating exception processing according to embodiments.

One of the typical RFID operations is inventorying of tags by a reader (i.e. identifying a single tag from among many). A reader inventories tags one-by-one. Inventorying typically needs to be a fast operation. For example, if 250 tags are on a pallet, moving at 15 mph through a dock door, the reader has less than a second to read all the tags. The reader operates quickly, sending the data to a server or other network device as it reads. Commonly, many tags are merely inventoried, few are accessed.

According to embodiments, policies that allow a layered RFID system architecture to perform typical tag operations locally are implemented sending only "exceptions" to a higher layer.

All layers manage anticipated tag responses locally, without incurring handoff delays. Only exceptions require handoff between layers. Therefore, only exceptions incur delays. First layer 610 (modem) inventories tags quickly, receiving tag responses 630 (e.g. EPC 631, 632, 633, etc.), and comparing them to a post select criterion (operation 680). If the post select comparison 680 produces a match, control of the tag is handed off to second layer 620. Once the second layer 620 completes its operations, the control is returned to first layer 610. The second layer 620 may be an AP, a server, a controller application, and the like.

According to other embodiments, tags that do not match a preselect criterion may be discarded prior to the post select comparison further saving processing time.

For example, a server or an AP associated with the reader may download a database file to the modem containing information for all the tags the modem should see and what the modem should do with them. The modem may inventory and access tags locally, batching inventory and access results to the server or the AP. The modem only hands off control to the server or the AP when a tag is not in the downloaded database file.

Figure 6B:
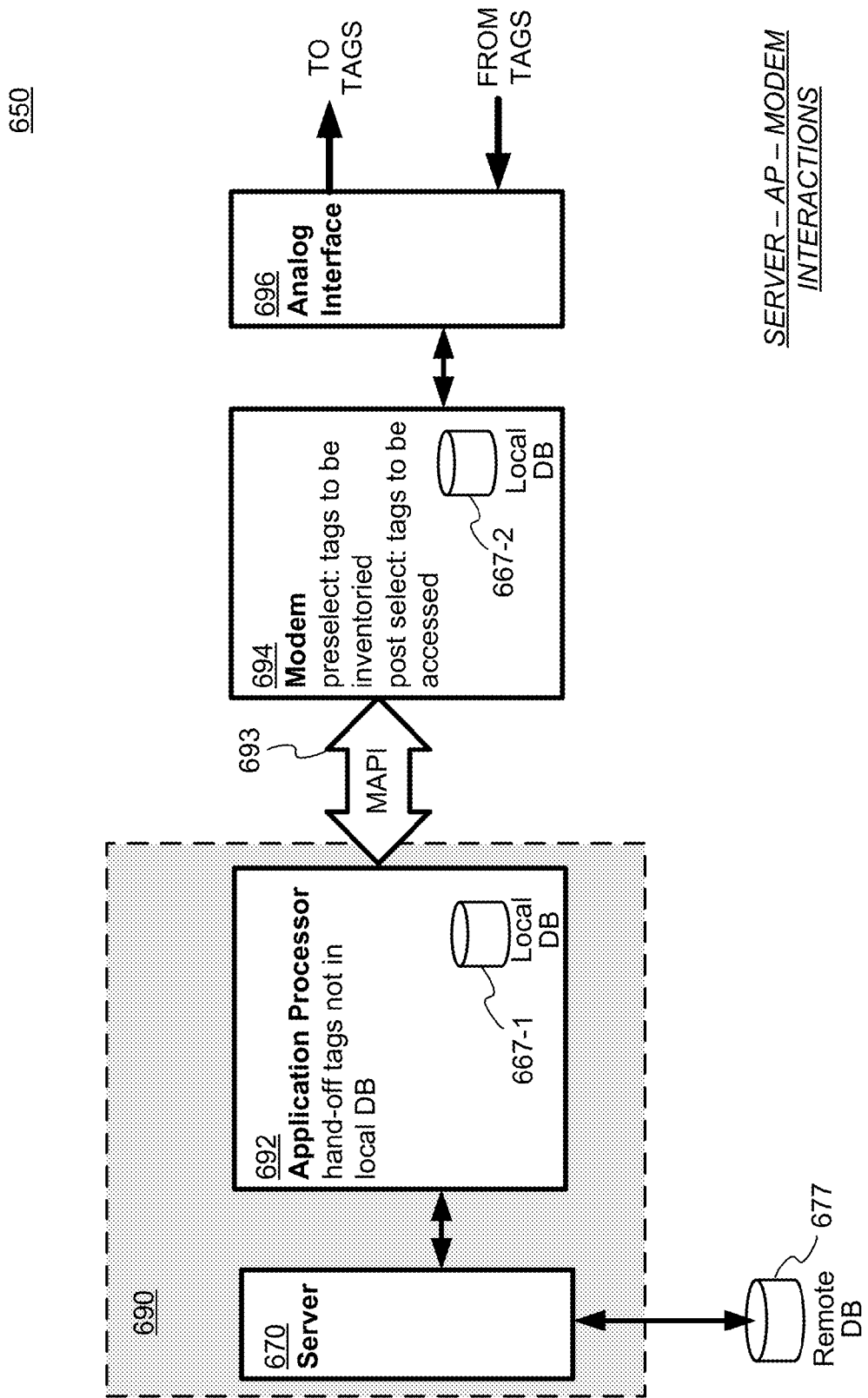
FIG. 6B is a conceptual diagram illustrating interactions for implementing the exception processing of FIG. 6A according to embodiments.

FIG. 6B is a conceptual diagram illustrating interactions for implementing the exception processing of FIG. 6A according to embodiments.

Modem 694 performs radio functions such as transmitter signal processing, transmitting, receiving tag responses, and receiver signal processing. According to some embodiments, modem 694 may include local database 667-2 used to store a local list of tag data for identifying tags that are to be selected.

Application Processor (AP) 692 processes tags and interfaces with higher levels of reader control such as server 670 or a controller application (not shown) through a network. AP 692 may also decide what the modem should do with tags, choose the protocol (e.g. Class-0, Class-1, Class-1, Gen2, etc.), tell the modem which tags to select, filter tag reads, and identify tag capabilities prior to accessing it. AP 692 may further match tag manufacturer ID to its internal tag manufacturers/variants database, issue appropriate commands (for example, AP 692 may only read user memory if it exists on a particular tag), receive and process server requests, and send EPC data to server 670.

Local database 667-1 is used to store list of tags for the select operations described herein. In some embodiments, remote database 677 may also be used to store part or all of the tag lists or other data associated with it. For example, data stored in remote database 677 or local database 667-1 may be forwarded to modem 694 for generation of selection criteria.

The Modem API (MAPI) 693 is the interface between modem 694 and AP 692. In a typical operation, AP 692 tells modem 694 which selection criteria to implement via MAPI 693. Modem 694 reports its results to AP 692 via MAPI 693, and the MAPI allows a handoff of control between the modem and the AP.

Figure 6C:
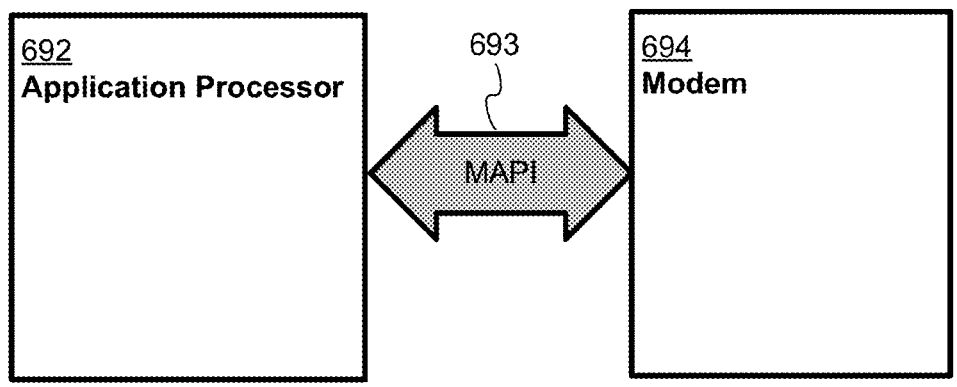
FIGS. 6C and 6D illustrate details for implementing the embodiments of FIG. 6B.
Figure 6D:
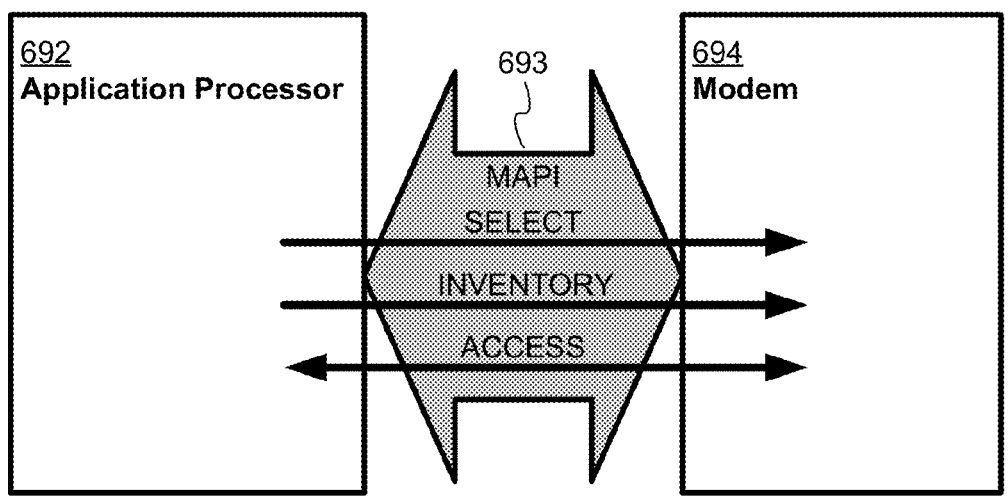

FIGS. 6C and 6D illustrate details for implementing the embodiments of FIG. 6B using a MAPI. As mentioned above, MAPI 693 facilitates communication between AP 692 and modem 694.

In a typical implementation, once modem 694 is inventorying the tags, modem 694 talks first while AP 692 listens. Modem 694 performs tag functions, and AP 692 receives results from the modem. This is followed by AP 692 talking and modem 694 listening, where AP 692 tells modem 694 what to do next. Modem 693 receives commands from AP 692 and performs them on the tags.

Referring to FIG. 6D, typical commands that are exchanged over MAPI 693 between AP 692 and modem 694 are inventory and access commands. As part of the inventorying process, select commands may also be exchanged over MAPI 693.

Select is a global method that a reader uses to choose, a priori, which tags it wants to inventory. Inventory is a global procedure that a reader uses to count tags and identify the tag types, one at a time, until it counts them all. Access is a non-global procedure that a reader uses to modify individual tags. Select operation uses preselect and/or post select masks to compare tags to a local database and report exceptions to AP 692 as part of the inventorying process.

Access includes read, write, lock, kill, and custom commands. A reader must associate an external parameter with the tag ID in order to perform the operation(s). In the read operation, the reader needs to know what data is on the tag, and what subset of the data it needs to read. For the write operation, the reader needs to know what to write to the specific tag, and where to write it. For the lock operation, the reader needs to know the current state of the tag's memory, what to change, and whether it needs a password. For the kill operation, the reader must use the proper kill password.

Access operations may also include security and/or file management commands. Security commands involve some aspect of reader/tag security (e.g., reader/tag electronic signing of messages, encryption/decryption, verification of tag/reader authenticity, transmitting/receiving secure messages, or any other security-related aspect of reader/tag communication). File management commands involve files stored on the reader and/or tag, and may include creating, deleting, opening, closing, and/or modifying one or more files stored on the reader and/or tag.

Figures 7A, 7B:
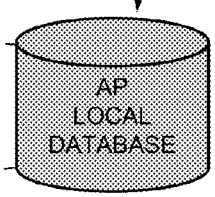
FIGS. 7A and 7B are diagrams illustrating data mapping of a tag memory and a local database of an RFID reader with example TIDs.

FIGS. 7A and 7B are diagrams illustrating data mapping of a tag memory and a local database of an RFID reader with example TIDs.

As shown in FIG. 7A, the data stored in tag memory 760 may include identification information associated with tag 110-K, information associated with an item the tag is attached to, communication parameters such as a password, externally delivered data, and the like. Data may be stored in tag memory 760 during a production stage, or during an operation. A tag processing block may access tag memory 760 to store or retrieve one or more of a received command, password, and externally delivered data. The processing block may also access tag memory 760 to change its contents based on a command received from reader 120.

Tag memory 760 may be partitioned into user-specific portion 762, tag-identification portion 764, object-identification portion (EPC) 766, and reserved portion 768. In other embodiments, tag memory 760 may be partitioned in other ways with fewer or more portions, or not partitioned at all.

User-specific portion 762 may be employed to store user-specified information including sensor data if the tag is associated with a sensor whose data is mapped to user memory. Tag-identification portion (TID) 764 may be employed to store information associated with a tag identifier, including sensor data if the sensor data is mapped to TID memory.

Object identification portion (EPC) memory 766 can be arranged to store, as convenient, a protocol control (PC) parameter, an EPC code, and/or a CRC16 (cyclic redundancy check) as shown in tag memory addresses 769. EPC memory may also contain sensor data if the sensor data is mapped into EPC memory.

Reserved memory portion 768 may be used to store system parameters such as passwords. Tag memory addresses 769 illustrate two such example parameters, an access command password and a kill command password. Reserved memory may also contain sensor data if the tag is associated with a sensor whose data is mapped into reserved memory.

Any portion of memory may store data in a single group, such as a single byte or word, or may store data in multiple groups or words (multiple bytes).

AP Local database 757, shown in FIG. 7B, represents local data storage in the application processor block of the reader that may be utilized to store local list of TIDs 779 for local decision making in selecting tag sub-populations.

Figure 8A:
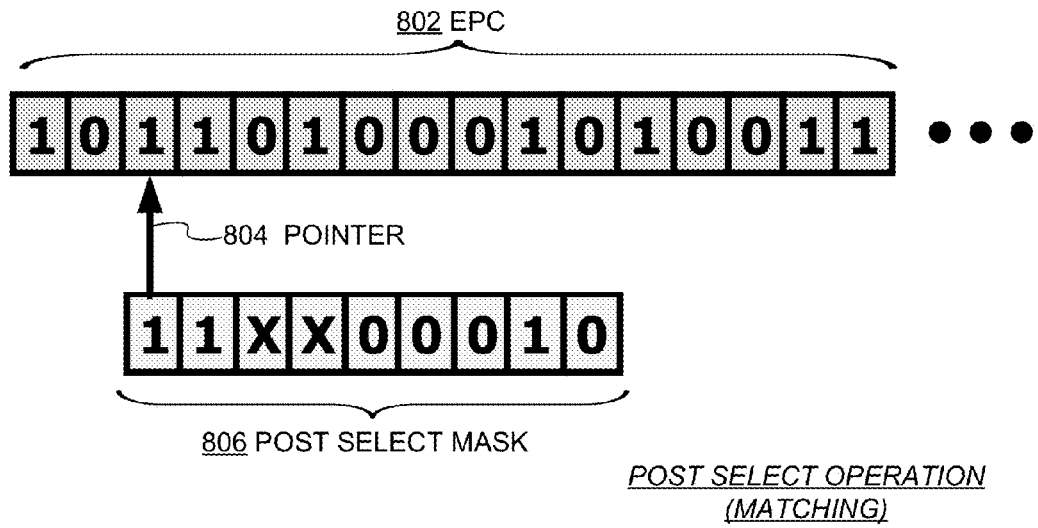
FIGS. 8A and 8B illustrate matching and non-matching post select operations, respectively, with a post select mask and an example EPC.
Figure 8B:
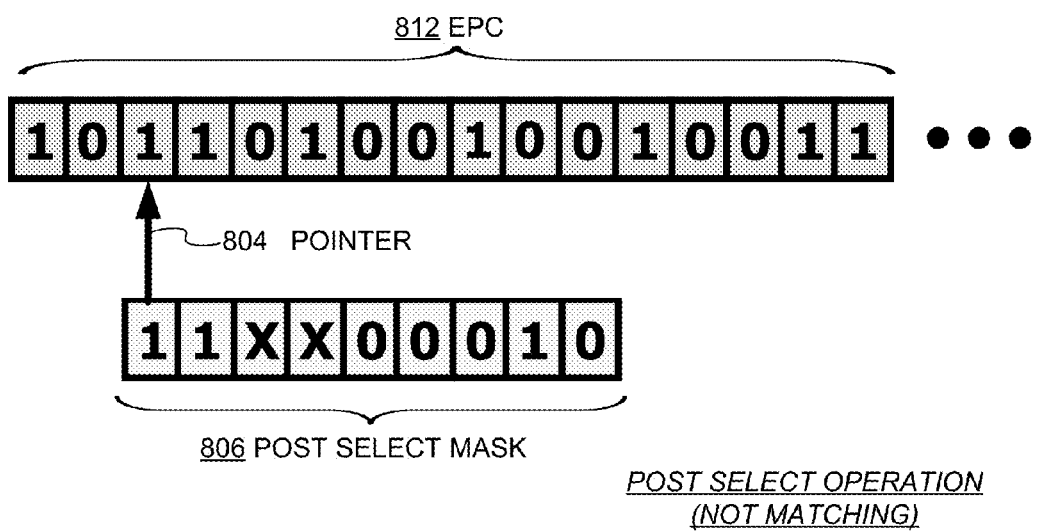

FIGS. 8A and 8B illustrate matching and non-matching post select operations, respectively, with a post select mask and an example EPC. Tag memory 760 in FIG. 7A may include identification data, such as EPC data, in binary format (EPC 802).

A post select criterion passed to the modem or generated by the modem based on received instructions may include a post select mask address in a number of ways, such as by a post select mask address pointer 804 and post select mask length. The post select mask address pointer may specify the start of the post select mask address, and the post select mask length may specify the length of the post select mask value 806 located at the starting address.

In example diagram of FIG. 8A, post select mask value 806 has a mask length of nine bits. Post select mask address pointer 804 indicates that the EPC data to be compared begins at the third bit of tag memory 760.

During operation, the tag processing block reads tag memory 760 beginning from the third bit as indicated by post select mask address pointer 804, and reads the number of bits specified by the mask length parameter. The processing block compares the contents of that portion of memory 760 to post select mask value 806.

In example diagram, post select mask value 806 matches the indicated portion of tag memory 760, so the processing block sets a flag accordingly.

The example diagram of FIG. 8B shows the same tag memory (760) with a different EPC value 812 and post select mask address pointer 804. The post select mask value 806 is the same as in FIG. 8A. During the comparison operation, the processing block detects that the seventh bit of tag memory 760 is different from the corresponding bit value in post select mask value 806. Therefore, there is no match in example diagram of FIG. 8B, and the flag is set to a different value by the processing block.

Figure 9A:
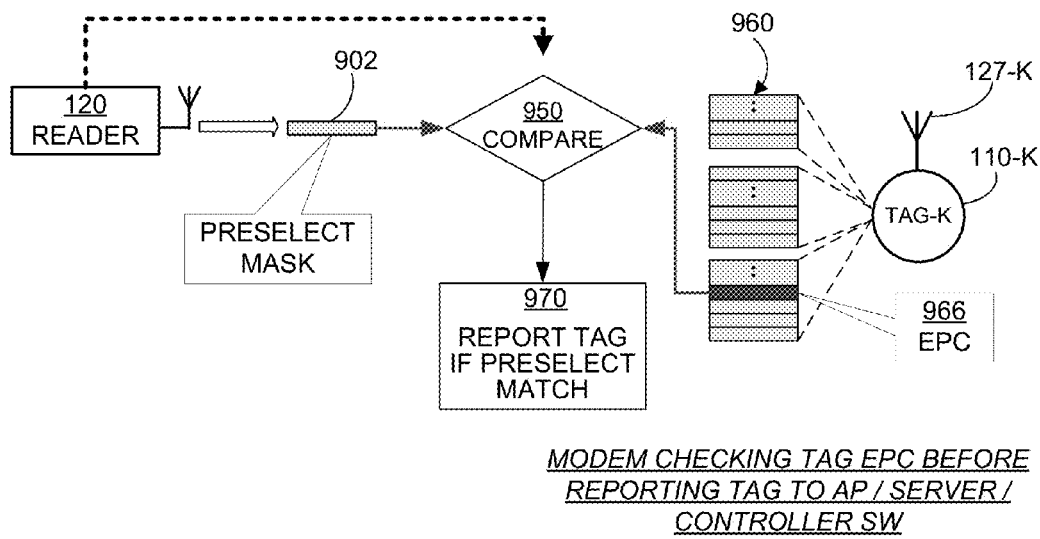
FIG. 9A is a conceptual diagram for explaining how a modem checks a tag EPC before reporting a tag.

FIG. 9A is a conceptual diagram for explaining how a modem checks a tag EPC before reporting a tag. In this example embodiment, the preselect mask value 902 sent with the preselect command by the modem block of reader 120 is compared EPC 966 stored in tag memory 960. Tag 110-K includes other addresses in tag memory 960. In other embodiments, memory contents in other addresses may also be used for comparison in preselect operation.

Comparison operation 950 may be performed by tag 110-K, which stores the preselect mask to a memory location, then compares the preselect mask with the EPC value at memory address 966 and determines whether they match. The tag may then respond to the reader reporting the match.

In another embodiment, tag 110-K may perform the comparison as it receives the preselect command, without first saving the preselect mask value into a memory location. In yet another embodiment, tag 110-K may report its EPC value to the reader, which performs the comparison operation 950.

Depending on a result of the comparison (i.e. if there is a match or not), a flag may be set in the tag or in the reader. The flag may be a value stored at another memory location, may be a state machine value, and the like.

At operation 970, the modem block of the reader may report the tag to the application processor block or a server controlling the reader if there is a match. The AP block or the server may then determine additional operations to be performed with the tag and instruct the modem accordingly.

Figure 9B:
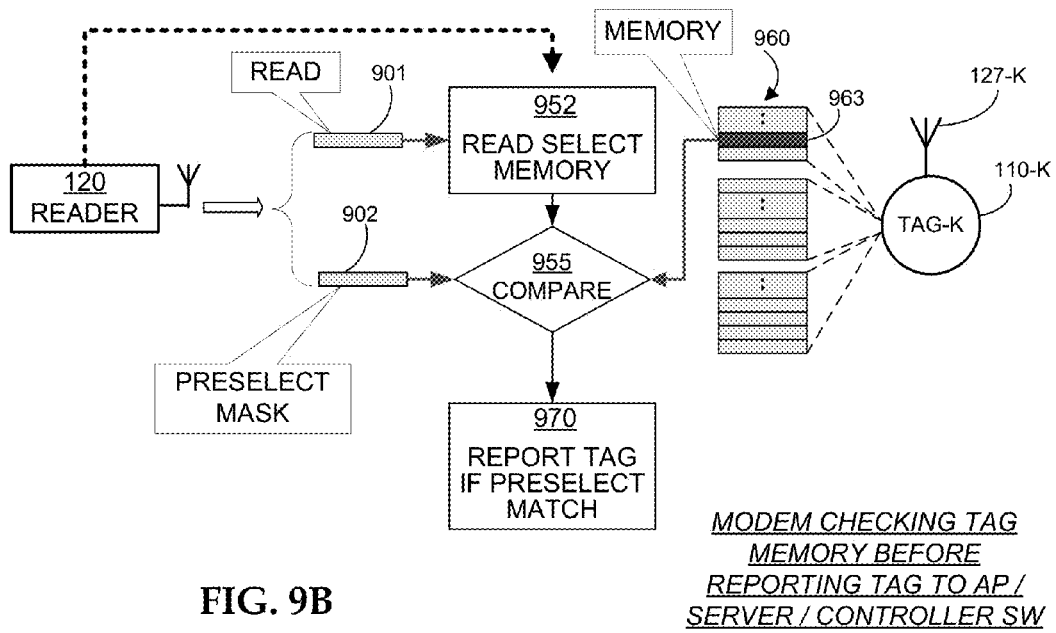
FIG. 9B is a conceptual diagram for explaining how a modem checks a tag memory before reporting a tag.

FIG. 9B is a conceptual diagram for explaining how a modem checks a tag memory before reporting a tag. As mentioned above, tag memory contents other than the EPC data may also be used for selecting subpopulations of tags.

Differently from the operations in FIG. 9A, reader 120 may send a read command (901) performing a read operation 952 for a selected location of tag memory 960 (in the example scenario, memory location 963).

Comparison operation 955 may then be performed using the preselect mask in preselect command 902 and the data from memory location 963 as described above. If there is a match, tag 110-K may be reported by the reader modem block to the AP block, the server, or a controller application.

Figure 9C:
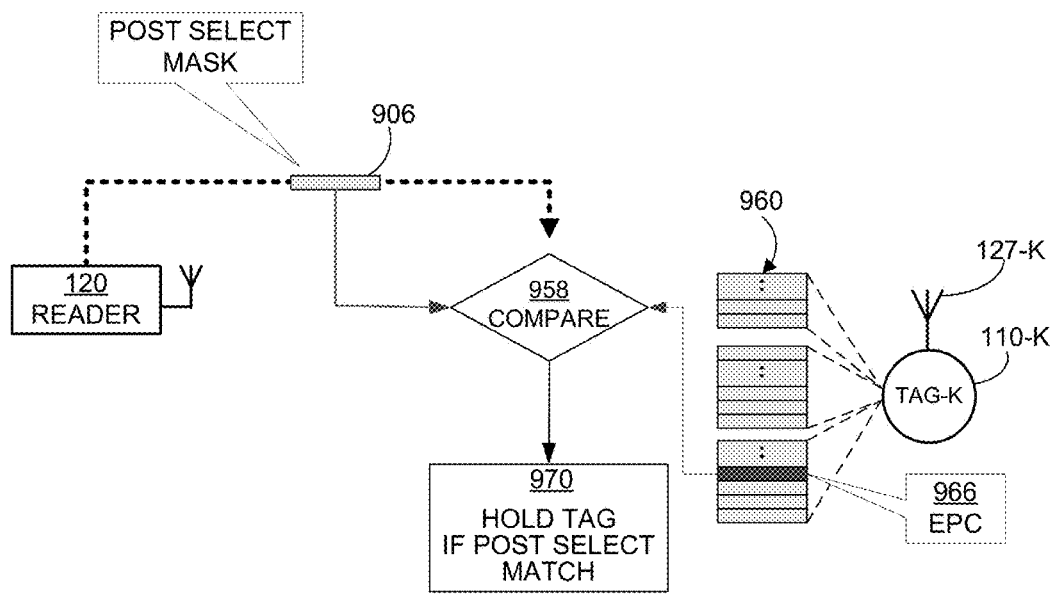
FIG. 9C is a conceptual diagram for explaining how a modem holds a tag based on post select match.

FIG. 9C is a conceptual diagram for explaining how a modem holds a tag based on post select match. In this example, another comparison operation is used by the RFID reader. This time, the mask value used in the comparison is a post select mask included in post select criterion 906. The comparison operation 958 is performed between the post select mask value and the EPC value in memory location 966 of tag 110-K. As described previously, the comparison operation may be performed in different ways and order of operations.

If the reader detects a match, it holds the tag (i.e. the tag waits for further instructions from the reader) until a decision and instructions are received from higher layers of the reader such as the AP block, the controller, and the like.

By holding the tag in response to a match with the post select mask value, processing time is saved, since the tag is not fully accessed until further instructions are received by the modem. At the same time, the modem does not have to go through the complete selection process again having found a matching tag.

The claimed subject matter also includes methods. Some are methods of operation of an RFID reader or RFID reader system. Others are methods for controlling an RFID reader or RFID reader system.

These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

According to some embodiments, a method for an RFID reader system with at least two layers to process received RFID tag responses includes receiving a particular one of the responses at a first layer, determining whether the particular response meets at least one post select criterion, still at the first layer, and handing off control from the first layer to a second layer if the post select criterion is met. The reader may then wait until control is returned to the first layer and until a second response is received at the first layer.

The method may further include reporting to the second layer at least a portion of the particular response always or only if it meets a reporting condition, such as a preselect criterion.

Applying the post select criterion may include comparing the particular response to a mask. Each response may be received by establishing communication with a respective individual tag, and the established communication with the individual tag that originated the particular response may be maintained until control is received back from the second layer.

The method may also include reading the RFID tag that provided the particular response before determining whether the post select criterion is met. The reading may be based on a characteristic of the post select criterion. Moreover, the post select criterion may be received at the first layer from the second layer.

According to other embodiments, the method may include, determining whether the particular response meets a preselect criterion, where the post select criterion is applied only if the preselect criterion is met. The particular response may be discarded, if it does not meet the preselect criterion.

In further embodiments, associated data may be generated for the particular response and reported to the second layer along with the portion of the particular response. The associated data may include a time stamp, an indication about a received signal strength of the particular response, an RF channel used by the tag, an antenna used by the tag, and the like.

In some embodiments, a reader transmit power may be adjusted for performing an access operation. The amount by which the transmit power is adjusted may be determined by the modem layer and/or received from a higher layer, and may be based on a tag response characteristic (e.g., power level, frequency, phase), tag type, access operation type, environmental noise level, or any other suitable reader/tag/environmental parameter. The reader transmit power may be increased for the access operation and decreased for subsequent inventorying, and the power levels used for access operations and inventorying may vary depending on the access operation and inventory cycle.

Methods are now described more particularly according to embodiments.

Figure 10:
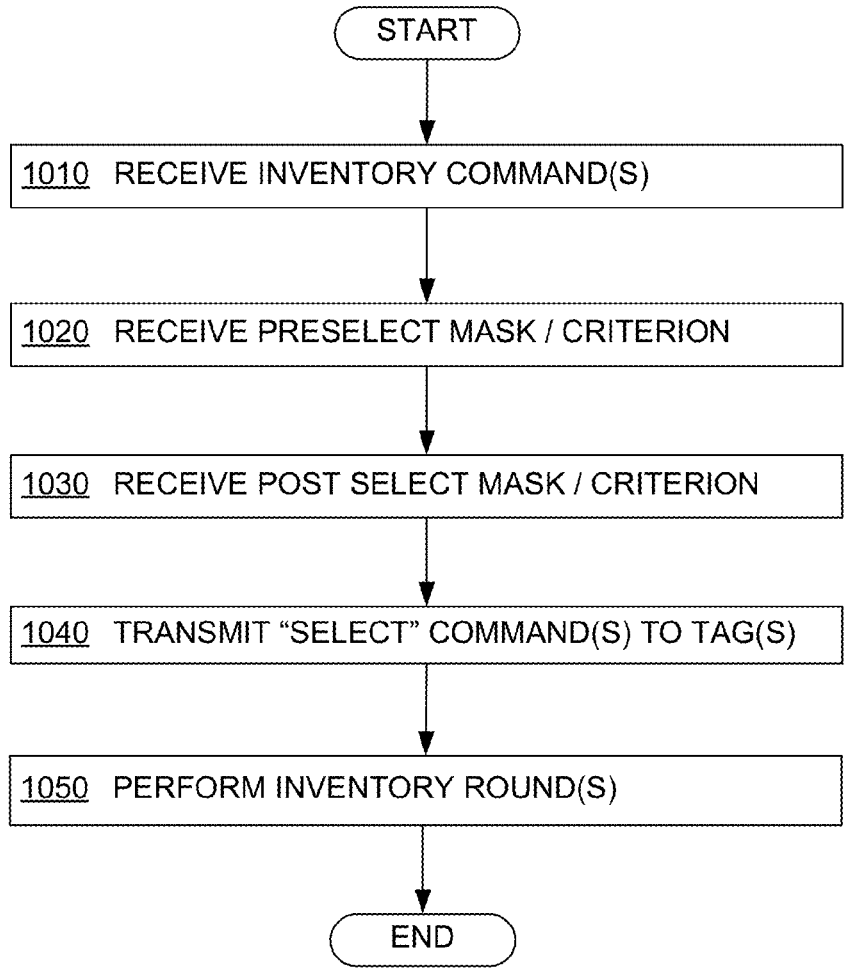
FIG. 10 is a flowchart of a process for inventorying tags according to embodiments.

FIG. 10 is a flowchart of a process for inventorying tags according to embodiments. The method of flowchart 1000 may be implemented in an RFID reader such as RFID reader 120 of FIG. 1.

According to an operation 1002, one or more inventory commands are received. Before executing the inventory commands, the reader may select a subpopulation of tags within its field of view.

According to a next operation 1004, a preselect criterion (or mask) is received by a modem block of the RFID reader. The preselect criterion/mask is used to eliminate a portion of the tags before applying another criterion/mask and further reducing the subpopulation. The preselect criterion or mask may be received from an AP block, a server, or a controller application associated with the reader, or generated by the modem in response to receiving instructions from one of the listed components.

According to a next operation 1006, a post select criterion or mask is received by the modem block from one of the components listed above. The post select criterion may also be used to eliminate a portion of the tags. For example, the post select criterion may include the tag EPC matching a list of EPC values in a local database in the reader. The matching tag(s) may be reported to higher levels such as the AP block, while the non-matching ones are discarded.

According to a next operation 1008, one or more select commands are transmitted to the tags. The select commands may include the received (or generated) preselect and/or post select criteria. Furthermore, the select commands may be combined using a Boolean logic operation. Tag responses to the select command(s) determine which tags meet the criteria. The tags meeting the criteria may be reported to higher levels as mentioned previously for further operations.

According to next optional operation 1010, inventory rounds are performed on the selected tags. By reducing the tag population to a smaller portion, valuable processing time may be significantly saved.

The operations described in FIG. 10 are high level example operations between a reader and tags. More detailed operations illustrating how embodiments may be implemented are described below.

Figure 11:
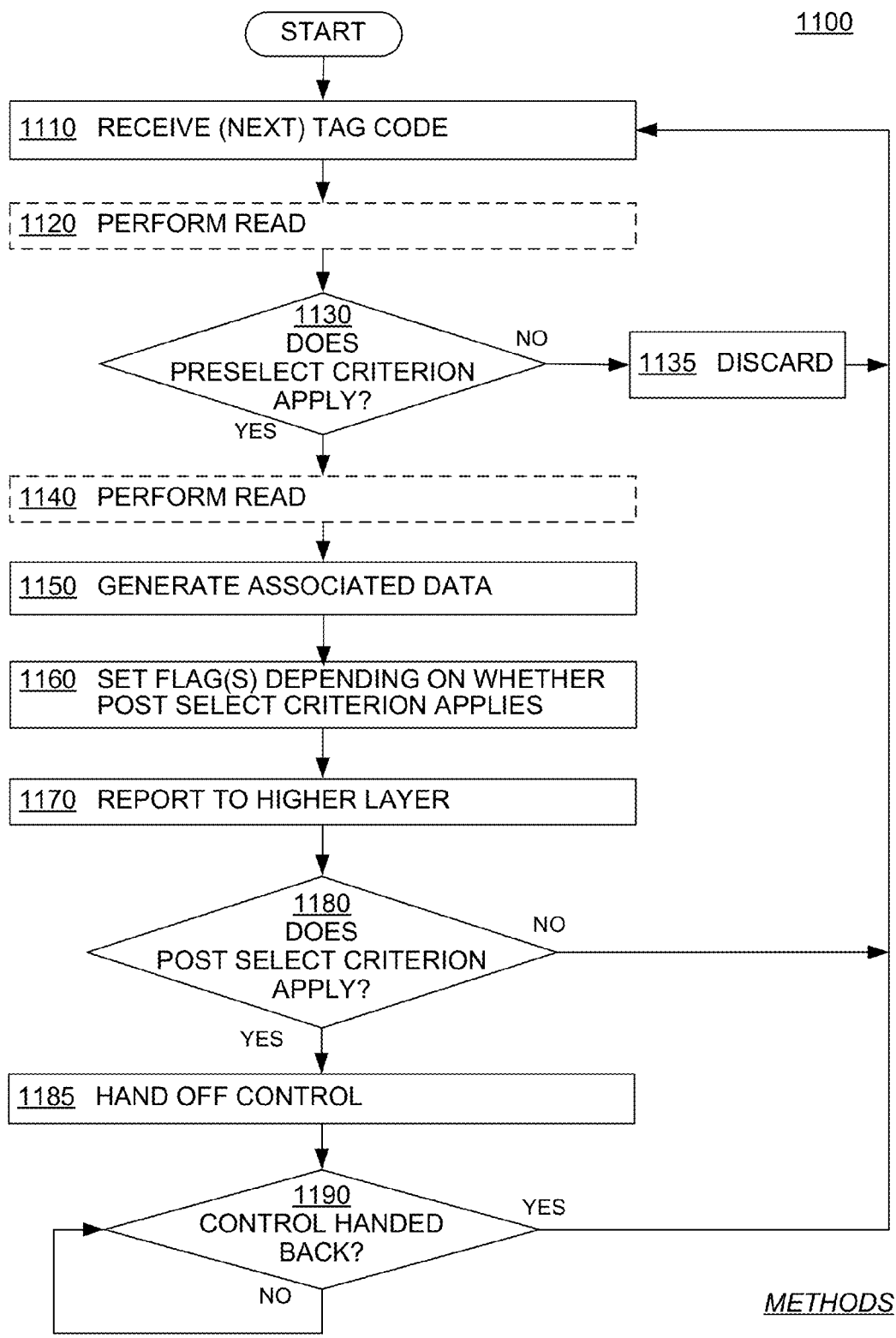
FIG. 11 is a flowchart of a portion of the process of FIG. 10 with detailed operations.

FIG. 11 is a flowchart of a portion of the process of FIG. 10 with detailed operations.

Process 1100 begins at operation 1110 where a tag code (or a next tag code in continued processing) is received.

According to a next optional operation 1120, a read operation may be performed to retrieve a memory content from the tag.

According to a next decision operation, a determination is made whether a preselect criterion applies to the tag. The preselect criterion may be used to eliminate tags by the first layer of the RFID reader without reporting to the higher layers. If the tag does not meet the preselect criterion, it is discarded at operation 1135. Processing then returns to operation 1110.

If the tag meets the preselect criterion, another read may be performed at a next optional operation 1140.

According to a next operation 1150, data associated with a response to the read operation may be generated. The data associated with the response may include a time stamp, a received signal power level, and the like.

According to a next operation 1160, one or more flags may be set depending on whether a post select criterion applies. The flags may be values stored at a memory location, state machine values, and the like.

According to a next operation 1170, the tag may be reported to a higher layer such as the AP block, the server, the controller application, and the like.

According to a next decision operation 1180, a determination is made whether the post select criterion applies. If the post select criterion does not apply, processing may return to operation 1110. If the post select criterion applies, processing may advance to operation 1185.

At operation 1185, the modem layer may hand off control of the tag to the higher layer for further operations. As described previously, the tag may be held in some embodiments until the determination is made to hand off control of the tag to the higher layer.

According to a next decision operation 1190, a determination is made whether the tag control is handed back to the modem layer. If the modem layer receives back the control, processing returns to operation 1110 for receiving another tag code. Otherwise, the modem layer continues to wait for the control to be handed back.

Figure 12:
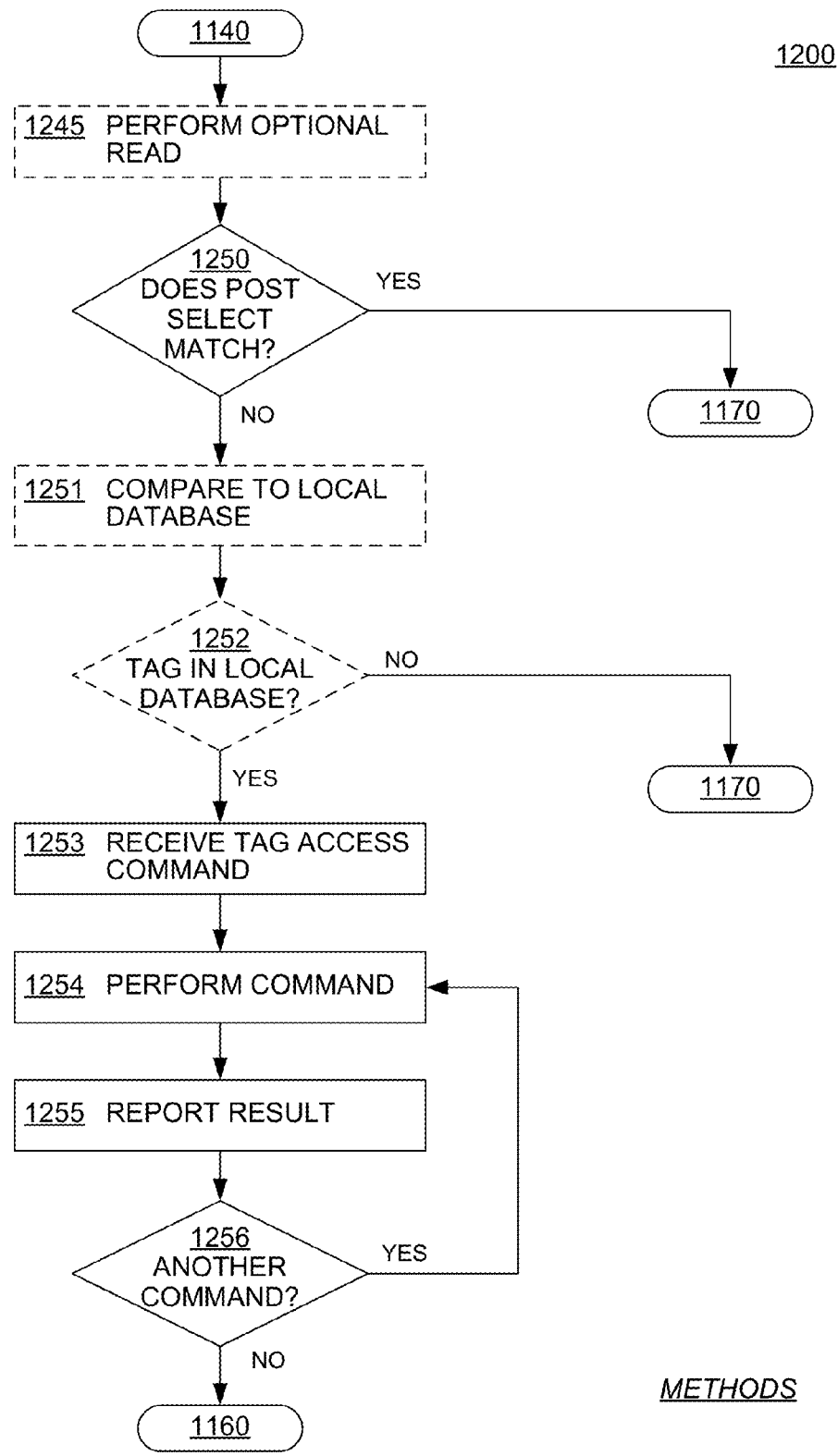
FIG. 12 is a flowchart of a portion of the process of FIG. 11 with detailed operations.

FIG. 12 is a flowchart of a portion of the process of FIG. 11 with detailed operations. Process 1200 begins following the optional read operation 1140 of process 1100 and continues at operation 1160 where flags are set depending on whether the post select criterion applies or not.

According to an optional operation 1245, an optional read is performed on the tag. The optional read operation may be performed on select tags where the reader needs to access tag memory content while inventorying the tag population.

According to a next decision operation 1250, a determination is made whether the post select mask matches the tag memory content such as the EPC data from the tag. If there is a match, processing continues to operation 1170 of process 1100 where the tag is reported to a higher layer. Otherwise, processing advances to optional operation 1251.

According to next operation 1251, the tag memory content is compared to a local database. In one embodiment, the local database may be maintained within the AP block.

According to a next decision operation 1252, a determination is made whether the tag information is included in the local database. If the tag is not found in the local database, processing continues to operation 1170 of process 1100 where the tag is reported to a higher layer. Otherwise, processing advances to optional operation 1253.

According to a next operation 1253, a tag access command is received from a higher layer. Tag access commands may include read, write, lock, kill, security commands, file management commands, and/or any custom command.

According to a next operation 1254, the access command is performed by the first (modem) layer.

According to a next operation 1255, the results of the access operation are reported to the higher layer(s). For example, confirmation of a successful write operation may be reported to a server controlling the RFID reader.

According to a next decision operation 1256, a determination is made whether another access command is to be executed. If the first layer is to execute another command, processing returns to operation 1254. Otherwise, processing moves to operation 1160 of process 1100 where flags are set depending on whether post select criterion applies.

In some embodiments, an RFID reader may transmit at different power levels, depending on the desired operation. For example, a reader inventorying a group of tags may transmit at a relatively low power in order to limit the read range and thereby avoid inventorying stray tags. Upon singulating a particular tag, the reader may increase its transmit power to perform an access operation on that particular tag. Access operations, as described above, may involve retrieving information stored at the tag and/or causing information stored at the tag to be modified. Higher transmit powers may be desirable for certain access operations (e.g., those that involve writing or modifying data on the tag) in order to avoid incomplete tag writes and potential corruption of tag data. Since the reader is only communicating with a single tag to perform the access operation, using a higher transmit power will not capture stray tags outside the desired read range.

Figure 13:
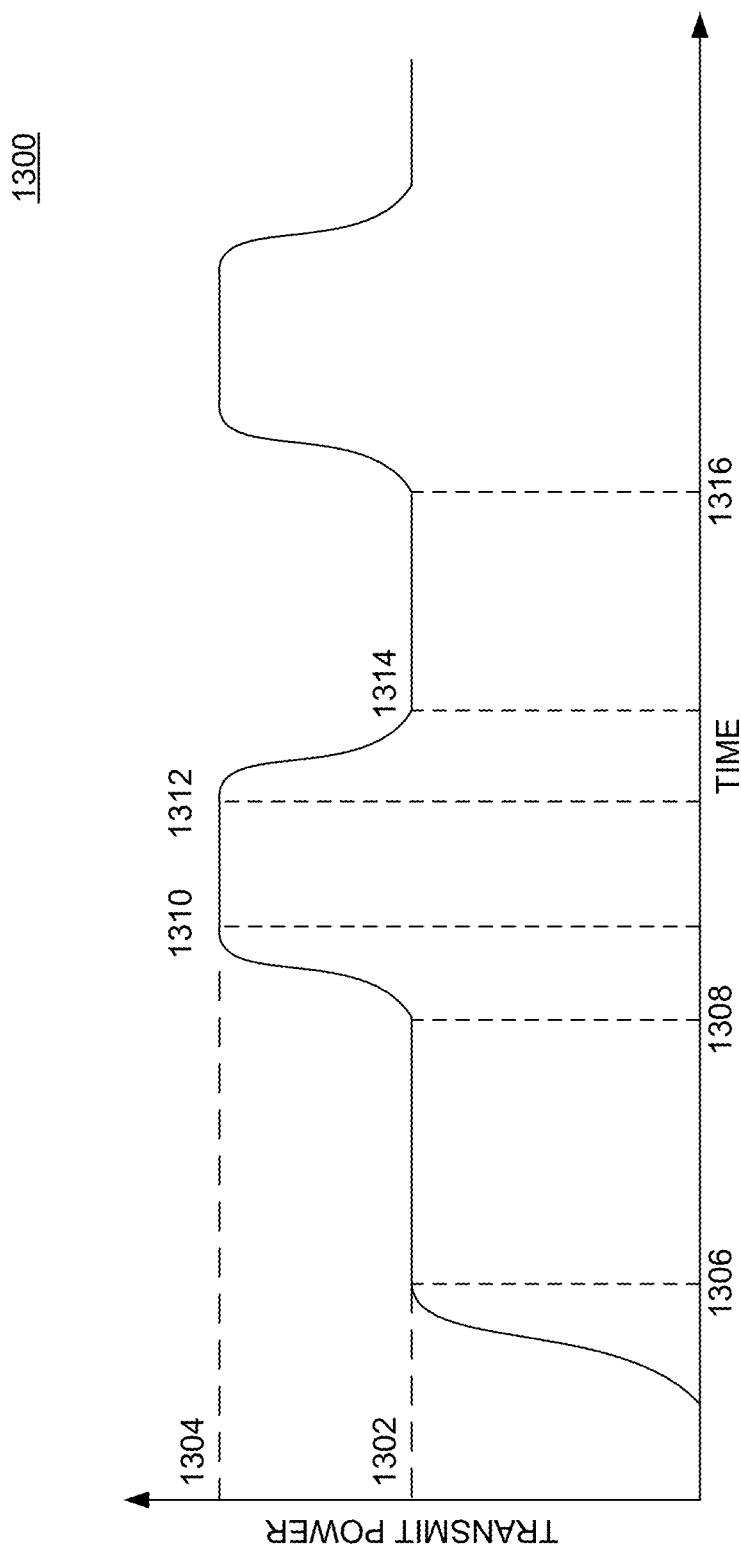
FIG. 13 is a conceptual diagram for explaining the use of different transmit power levels for inventorying and access operations.

FIG. 13 is a conceptual diagram 1300 for explaining the use of different transmit power levels for inventorying and access operations. The vertical axis represents the transmit power used by a reader, and the horizontal axis represents time. At time 1306, the reader inventories a group of tags using power level 1302, which may be selected to confine the read range/zone in order to prevent reading stray tags. At time 1308, the reader identifies a tag on which to perform an access operation (e.g., based on preselect criterion, postselect criterion, and/or instructions from a higher layer). The reader then increases its transmit power to power level 1304 and performs the access operation on the tag with the higher power level. After completion of the access operation at time 1312, the reader decreases its transmit power back to power level 1302 and continues to inventory tags at time 1314. Subsequently, the reader may identify another tag on which to perform an access operation at time 1316, and repeat the process of increasing transmit power, performing the access operation, and decreasing transmit power.

The power levels at which a reader inventories tags and performs access operations may be determined by the reader at the first (modem) layer and/or a higher layer. For example, when instructions for an access operation are received from a higher layer, the first layer may itself determine the appropriate transmit power level to use. In some embodiments, the instructions from the higher layer may include the transmit power level to use for the access operation and/or an amount to increase the transmit power level (e.g., from the inventorying power level 1302 to the accessing power level 1304). The first layer and/or higher layers may determine the various transmit power levels to be used for inventorying and/or accessing based on one or more reader/tag operating parameters and environmental conditions. For example, the power levels may be determined based on the power level, frequency, and/or phase of a received tag response. The power levels may also be determined based on the tag type (which may be determined during the inventorying/singulation process), the type of desired access operation, the environmental noise level, and/or any other suitable reader, tag, or environmental parameter.

While FIG. 13 shows only two power levels, in some embodiments more transmit power levels may be used. For example, instead of all access operations being performed at a single transmit power level (e.g., power level 1304), different access operations may be performed at different transmit power levels. Similarly, inventorying may also occur at different transmit power levels instead of only occurring at a single transmit power level (e.g., power level 1302). In some embodiments, after performing an access operation (e.g., at time 1312), instead of decreasing the transmit power back to the power level previously used for inventorying (e.g., power level 1302), the reader may decrease the transmit power to a different power level. Similarly, in some embodiments, the reader may not increase its transmit power level for an access operation.

Figure 14:
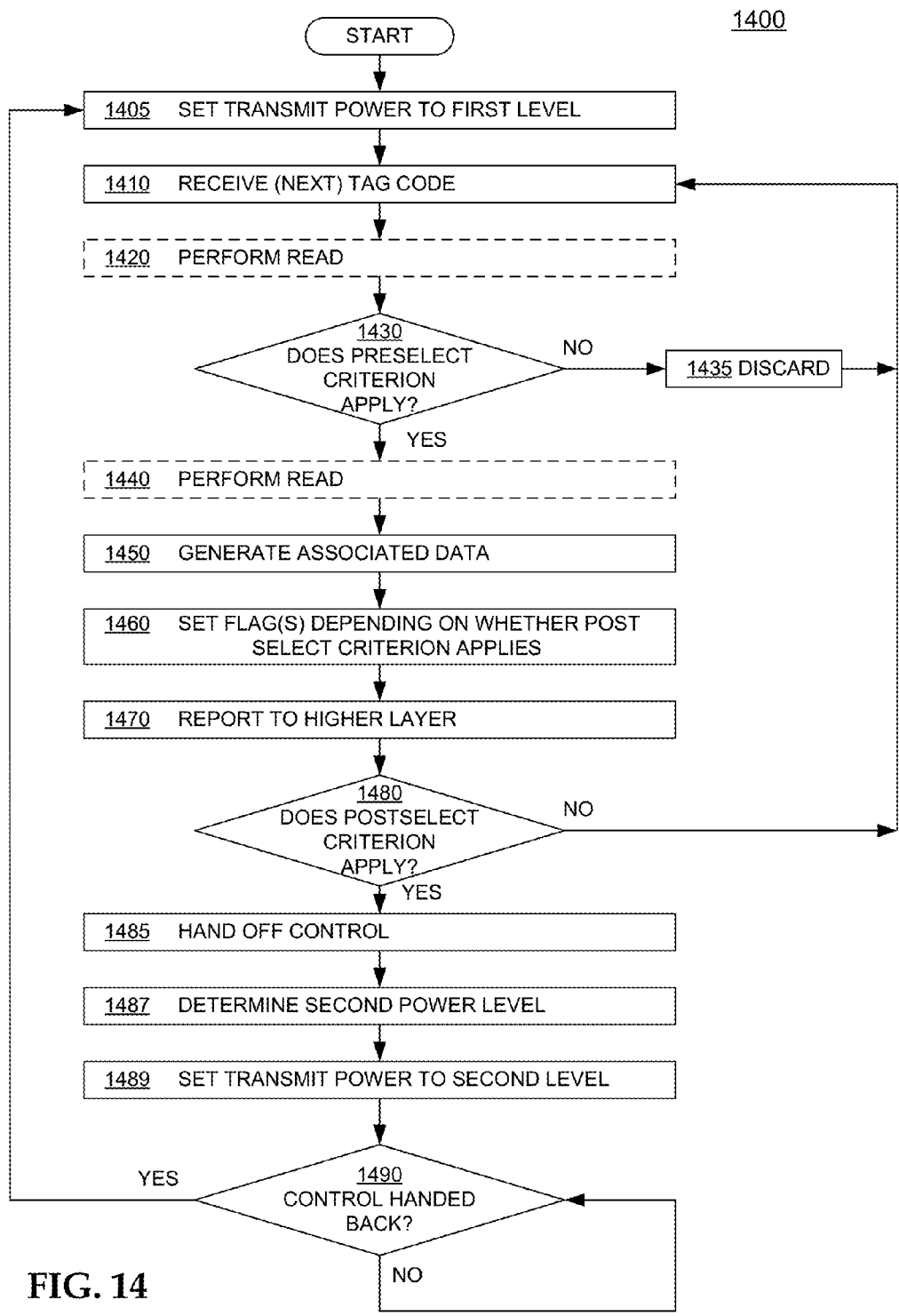
FIG. 14 is a flowchart of a process for inventorying tags and using different transmit power levels according to embodiments.

FIG. 14 is a flowchart of a process 1400 for inventorying tags and using different transmit power levels according to embodiments. Process 1400 is similar to process 1100 described above with relation to FIG. 11. In operation 1405, the reader transmit power is set to a first level suitable for inventorying operations (e.g., power level 1302 in FIG. 13). In operation 1410, a tag code (or next tag code in continued processing) is received. A read operation may be performed to retrieve data from the tag in optional step 1420. At decision operation 1430, a determination is made whether a preselect criterion applies to the tag, similar to operation 1130 in FIG. 11. If the tag does not meet the preselect criterion, it is discarded at operation 1435, and the process returns to step 1410.

On the other hand, if the tag does meet the preselect criterion in operation 1430, another read may be performed at optional operation 1440. Subsequently, in operation 1450, data associated with a response to the read operation or to a tag signal may be generated. The data may include a time stamp, a received signal power level, frequency, phase, noise level, tag type, or any other suitable data.

At operation 1460, one or more flags may be set depending on whether a post select criterion applies. The flag(s) may be values stored in memory, state machine values, or any other suitable stored value. The tag may be subsequently reported to a higher layer at operation 1470 (similar to operation 1170 in FIG. 11).

At decision operation 1480, a determination is made whether the post select criterion applies. If not, the process returns to operation 1410. If the post select criterion does apply, in step 1485 the first layer may hand off control to a higher layer for further operations. The tag may be held in some embodiments until the determination is made to hand off control to a higher layer.

The first layer may then determine a second power level and set the reader transmit power to the second power level at operations 1487 and 1489. The first layer may determine the second power level (or the amount to adjust the first power level) itself, or may receive it from a higher layer. The second power level may be determined (by the first layer or a higher layer) based on a tag response characteristic (e.g., power level, frequency, phase), a tag type, the desired access operation, the environmental noise level, and/or any other suitable reader, tag, or environmental parameter.

At operation 1490, a determination is made whether control has been handed back to the first layer. If so, the process returns to operation 1405, where the reader transmit power level may be set back to the first level or to a different level. Otherwise, the first layer continues to wait for control to be handed back.

In the above, the order of operations is not constrained to what is shown, and different orders may be possible. In addition, actions within each operation can be modified, deleted, or new ones added without departing from the scope and spirit of the claimed subject matter. Plus other, optional operations and actions can be implemented with these methods, as will be inferred from the earlier description.

In this description, numerous details have been set forth in order to provide a thorough understanding. In other instances, well-known features have not been described in detail in order to not obscure unnecessarily the description.

A person skilled in the art will be able to practice the embodiments in view of this description, which is to be taken as a whole. The specific embodiments as disclosed and illustrated herein are not to be considered in a limiting sense. Indeed, it should be readily apparent to those skilled in the art that what is described herein may be modified in numerous ways. Such ways can include equivalents to what is described herein.

The following claims define certain combinations and subcombinations of elements, features, steps, and/or functions, which are regarded as novel and non-obvious. Additional claims for other combinations and sub-combinations may be presented in this or a related document.

What is claimed is:

1. An RFID reader system for receiving and processing RFID tag responses, comprising:
   a first layer; and
   a second layer, in which the first layer is configured to:
      receive a postselect mask from the second layer;
      inventory a tag population at a transmit power;
      receive a tag response;
      if the response does not meet a preselect criterion, then discard the response; else
      report the response; and
      apply a postselect criterion by comparing the response to the postselect mask;
      if the response meets the postselect criterion then
         pause the inventory and handing off control from the first layer to the second layer;
         receive instructions from the second layer; and
         if the instructions include performing an access operation on the tag, then:
            determine an amount by which to increase the transmit power for the access operation;
            increase the transmit power by the determined amount;
            perform the access operation based on the instructions;
            then decrease the transmit power;
            then continue to inventory the tag population.

2. The system of claim 1, wherein the first layer is configured to increase the transmit power from a first level to a second level, then decrease it to the first level.

3. The system of claim 1, wherein the first layer is configured to increase the transmit power from a first level to a second level, then decrease it to a third level different from the first level.

4. The system of claim 1, wherein determining the amount includes receiving the amount in the instructions.

5. The system of claim 4, wherein the amount is determined based on one or more of: a tag response power level, a tag response frequency, a tag response phase, a tag type, an access operation type, and a noise level.

6. The system of claim 1, wherein the access operation is one of a read command, a write command, a lock command, a kill command, a security command, a file management command, and a custom command.

7. The system of claim 1, wherein the first layer is configured to pause the inventory until expiration of a predetermined waiting period.

8. The system of claim 1, wherein the first layer is further configured to:
   generate associated data for the tag response; and
   report to the second layer the associated data.

9. The system of claim 8, in which the associated data includes at least one of: a time stamp, an indication about a received signal strength of the tag response, an RF channel used by the tag, and a reader antenna.

10. A method for a first layer of a multilayer RFID reader system to process a plurality of received RFID tag responses, the method comprising:
- receiving a postselect mask from a second layer;
- inventorying a tag population at a transmit power;
- receiving a response from a tag;
- if the response does not meet a preselect criterion, then discarding the response; else
  - reporting the response and applying a postselect criterion by comparing the response to the postselect mask;
- if the response meets the postselect criterion then
  - pausing the inventory and handing off control from the first layer to the second layer;
  - receiving control and instructions back from the second layer; and
  - if the instructions include performing an access operation on the tag, then:
    - determining an amount by which to increase the transmit power for the access operation;
    - increasing the transmit power by the determined amount;
    - performing the access operation on the tag based on the instructions;
    - then decreasing the transmit power;
- then continuing to inventory the tag population.

11. The method of claim 10, wherein determining the amount includes receiving the amount in the instructions.

12. The method of claim 10, wherein the transmit power is increased from a first level to a second level, then decreased to the first level.

13. The method of claim 10, wherein the transmit power is increased from a first level to a second level, then decreased to a third level different from the first level.

14. The method of claim 10, wherein the amount is determined based on one or more of: a tag response power level, a tag response frequency, a tag response phase, a tag type, an access operation type, and a noise level.

15. The method of claim 10, wherein performing the access operation includes transmitting one of a read command, a write command, a lock command, a kill command, a security command, a file management command, and a custom command.

16. The method of claim 10, in which the inventory is paused until expiration of a predetermined waiting period.

17. The method of claim 10, further comprising:
- generating associated data for the tag response; and
- reporting to the second layer the associated data.

18. The method of claim 17, in which the associated data includes at least one of: a time stamp, an indication about a received signal strength of the tag response, an RF channel used by the tag, and a reader antenna.

* * * * *